United States Patent
Nakai et al.

(10) Patent No.: US 7,736,715 B2
(45) Date of Patent: *Jun. 15, 2010

(54) OPTICAL RECORDING MEDIUM, AND INFORMATION RECORDING/PLAYBACK APPARATUS AND METHOD USING THE MEDIUM

(75) Inventors: Tsukasa Nakai, Hino (JP); Noritake Oomachi, Yokohama (JP); Sumio Ashida, Yokohama (JP); Naomasa Nakamura, Yokohama (JP); Keiichiro Yusu, Yokohama (JP); Yasuhiro Satoh, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 834 days.

This patent is subject to a terminal disclaimer.

(21) Appl. No.: 11/448,877

(22) Filed: Jun. 8, 2006

(65) Prior Publication Data

US 2006/0291370 A1 Dec. 28, 2006

(30) Foreign Application Priority Data

Jun. 8, 2005 (JP) .............................. 2005-168344

(51) Int. Cl.
*B32B 3/02* (2006.01)

(52) U.S. Cl. .................... 428/64.4; 428/64.5; 428/64.6; 430/270.13

(58) Field of Classification Search ................ 428/64.5, 428/64.6; 430/270.13
See application file for complete search history.

(56) References Cited

U.S. PATENT DOCUMENTS 6,268,034 B1 7/2001 Kitaura et al.
6,296,915 B1* 10/2001 Yusu et al. .................. 428/64.1
6,632,583 B2 10/2003 Kunitomo et al.
6,806,030 B2* 10/2004 Terao et al. ............. 430/270.13
7,455,951 B2 11/2008 Ichihara et al.
2004/0017768 A1 1/2004 Hibino et al.
2004/0105182 A1* 6/2004 Nishihara et al. ............ 359/883
2004/0191683 A1* 9/2004 Nishihara et al. ...... 430/270.11
2005/0079444 A1* 4/2005 Kiyono et al. ......... 430/270.13
2006/0077869 A1 4/2006 Yusu et al.
2006/0077878 A1 4/2006 Nakai et al.
2007/0178272 A1* 8/2007 Nakai et al. ................. 428/64.4
2007/0248785 A1* 10/2007 Nakai et al. ................. 428/64.4

FOREIGN PATENT DOCUMENTS

JP 11-213446 8/1999

(Continued)

OTHER PUBLICATIONS

M. Kuwahara, et al., "thermal Original of Readout Mechanism on Super Resolution Near-Field Structure Disk—Appearance of super resolutional readout by thermal effect," Technical Report of IEICE, the Institute of Electronics, Information and Communication Engineers, Mar. 2004, Chapter 3.1.

(Continued)

*Primary Examiner*—Elizabeth Mulvaney
(74) *Attorney, Agent, or Firm*—Oblon, Spivak, McClelland, Maier & Neustadt, L.L.P.

(57) ABSTRACT

In a single-sided, recordable/rewritable phase change optical recording medium having one or more layers, an interface layer adjacent to a phase change optical recording film contains at least Zr (zirconium), O (oxygen), and N (nitrogen), and further contains one or both of Y (yttrium) and Nb (niobium).

20 Claims, 25 Drawing Sheets

FOREIGN PATENT DOCUMENTS

| | | |
|---|---|---|
| JP | 2000-322770 | 11/2000 |
| JP | 2001-232941 | 8/2001 |
| JP | 2002-150605 | 5/2002 |
| JP | 2003-6794 | 1/2003 |
| JP | 2003-323743 | 11/2003 |
| JP | 2004-95098 | 3/2004 |
| JP | 2004-303350 | 10/2004 |
| JP | 2005-4950 | 1/2005 |
| JP | 2005-116084 | 4/2005 |
| WO | WO 02/05275 A1 | 1/2002 |
| WO | WO 02/31825 | 4/2002 |

OTHER PUBLICATIONS

J. Tominaga et al., "Principle of Super Lens and the Progress," Technical Report of IEICE, the Institute of Electronics, Information and Communication Engineers, Sep. 1999, Fig 3.3.

Rie Kojima, et al. "Phase Change Optical Recording toward Next Generation" Proceedings of the 12$^{th}$ Symposium on Phase Change Optical Information Storage PCOS2000, The Society of Phase Change Recording, The Ceramic Society of Japan, Nov. 30-Dec. 1, 2000, pp. 36-41 and 1 cover page.

* cited by examiner $(ZrO_2-xN_x)_{1-y}((Y_2O_3)_{1-z}(Nb_2O_5)_z)_y$

| Sample No. | Composition(x, y, z) | Extinction Coefficient |
|---|---|---|
| 1 | (0.05, 0.05, 0) | 0 |
| 2 | (0.05, 0.05, 1) | 0 |
| 3 | (0.05, 0.05, 0.1) | 0 |
| 4 | (0.05, 0.01, 0) | 0 |
| 5 | (0.05, 0.01, 1) | 0 |
| 6 | (0.5, 0.05, 0) | $8.1 \times 10^{-3}$ |
| 7 | (0.5, 0.05, 1) | $8.0 \times 10^{-3}$ |
| 8 | (0.03, 0.05, 0) | 0 |
| 9 | (0.03, 0.05, 1) | 0 |
| 10 | (0.2, 0.05, 0) | $9.0 \times 10^{-4}$ |
| 11 | (0.2, 0.05, 1) | $9.3 \times 10^{-4}$ |
| 12 | (0.06, 0.05, 0) | 0 |
| 13 | (0.06, 0.05, 1) | 0 |
| 14 | (0.06, 0.1, 0) | $6.7 \times 10^{-4}$ |
| 15 | (0.06, 0.1, 1) | $6.6 \times 10^{-4}$ |
| 16 | (0.01, 0.05, 0) | 0 |
| 17 | (0.01, 0.05, 1) | 0 |

| Sample No. | Composition(x, y, z) | Sample No. | Composition(x, y, z) |
|---|---|---|---|
| 1 | (0.05, 0.05, 1) | 8 | (0.06, 0.05, 0) |
| 2 | (0.05, 0.04, 0) | 9 | (0.06, 0.05, 1) |
| 3 | (0.05, 0.04, 1) | 10 | (0.04, 0.1, 0) |
| 4 | (0.5, 0.05, 0) | 11 | (0.04, 0.1, 1) |
| 5 | (0.03, 0.05, 0) | 12 | (0.01, 0.05, 0) |
| 6 | (0.03, 0.05, 1) | 13 | (0.01, 0.05, 1) |
| 7 | (0.2, 0.05, 0) | --- | --- |

FIG. 4

| Sample No. | Composition system |
|---|---|
| 1 | Zr-Y-O-N-Hf |
| 2 | Zr-Y-O-N-Ti |
| 3 | Zr-Y-O-N-Ta |
| 4 | Zr-Y-O-N-Si |
| 5 | Zr-Y-O-N-Ge |
| 6 | Zr-Y-O-N-Ce |
| 7 | Zr-Y-O-N-Mg |

FIG. 5

| No. | Composition of recording film |
|---|---|
| 1 | Ge10Sb2Te13 |
| 2 | Ge4Sb2Te7 |
| 3 | Ge8Sb2Te13Bi2 |
| 4 | Ge3Sb2Te7Bi |
| 5 | Ge6Sb2Te13Sn4 |
| 6 | Ge3Sb2Te7Sn |
| 7 | Ge10Bi2Te13 |
| 8 | Ge2.9BiTe4.4 |
| 9 | Ge11.25BiTe12.75 |
| 10 | Ge10Sb1.2In0.8Te13 |
| 11 | Ge10Bi1.5In0.5Te13 |
| 12 | Ge4Sb1.5In0.5Te7 |
| 13 | Ge2.9Bi0.75In0.25Te4.4 |

FIG. 6

| Item | Condition |
|---|---|
| Wavelength[nm] | 405 |
| N.A. | 0.65 |
| Track Pitch[$\mu$m](Land & Grove) | 0.36 |
| Linear velocity [m/sec] (constant velocity) ※ | 5.4 |

※ Double velocity is 10.8 [m/sec], and fourfold velocity is 21.6 [m/sec]

FIG. 7

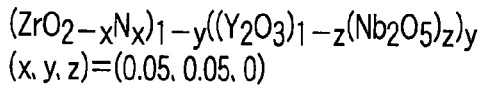

$(x, y, z) = (0.05, 0.05, 0)$

| Embodiment | (x, y, z) | CNR [dB] | SbER | Pw[mW] (L1) | T[%] (L0) | ER [dB] | Total evaluation |
|---|---|---|---|---|---|---|---|
| Second embodiment | (0.05, 0.05, 0) | 52.9 | 1.8×10$^{-5}$ | 5.5 | 51.4 | 32.8 | Very Good |
| Fourth embodiment | (0.05, 0.05, 0) | 52.6 | 1.5×10$^{-5}$ | 5.5 | 50.9 | 33.1 | Very Good |
| Fifth embodiment | (0.05, 0.05, 0) | 52.8 | 1.6×10$^{-5}$ | 5.2 | 50.9 | 33.1 | Very Good |

FIG. 8

| Sample No. | (x, y, z) | CNR [dB] | SbER | Pw[mW] (L1) | T[%] (L0) | ER [dB] | Total evaluation |
|---|---|---|---|---|---|---|---|
| 1 | (0.05, 0.05, 0) | 53.7 | $1.9 \times 10^{-5}$ | 5.5 | 52.1 | 34.8 | Very Good |
| 2 | (0.05, 0.04, 0) | 53.7 | $2.2 \times 10^{-5}$ | 5.5 | 52.2 | 34.9 | Very Good |
| 3 | (0.05, 0.04, 1) | 53.7 | $1.8 \times 10^{-5}$ | 5.6 | 52.0 | 34.8 | Very Good |
| 4 | (0.5, 0.05, 0) | 52.0 | $2.6 \times 10^{-5}$ | 5.5 | 50.9 | 30.9 | Good |
| 5 | (0.03, 0.05, 0) | 53.7 | $1.9 \times 10^{-5}$ | 5.5 | 52.1 | 34.6 | Very Good |
| 6 | (0.03, 0.05, 1) | 53.7 | $2.2 \times 10^{-5}$ | 5.6 | 52.0 | 34.7 | Very Good |
| 7 | (0.2, 0.05, 0) | 51.9 | $2.6 \times 10^{-5}$ | 5.8 | 50.9 | 31.3 | Good |
| 8 | (0.06, 0.05, 0) | 53.7 | $2.0 \times 10^{-5}$ | 5.5 | 52.2 | 34.8 | Very Good |
| 9 | (0.06, 0.05, 1) | 53.7 | $1.9 \times 10^{-5}$ | 5.5 | 52.1 | 34.9 | Very Good |
| 10 | (0.04, 0.1, 0) | 52.4 | $2.1 \times 10^{-5}$ | 5.6 | 51.2 | 31.3 | Good |
| 11 | (0.04, 0.1, 1) | 52.3 | $2.1 \times 10^{-5}$ | 5.8 | 51.2 | 32.6 | Good |
| 12 | (0.01, 0.05, 0) | 52.8 | $2.4 \times 10^{-5}$ | 5.7 | 52.0 | 31.4 | Good |
| 13 | (0.01, 0.05, 1) | 52.2 | $2.6 \times 10^{-5}$ | 5.8 | 52.0 | 32.1 | Good |

FIG. 9

| Sample No. | Additional element | CNR [dB] | SbER | Pw[mW] (L1) | T[%] (L0) | ER [dB] | Total evaluation |
|---|---|---|---|---|---|---|---|
| 1 | Hf | 53.2 | $1.9 \times 10^{-5}$ | 5.6 | 51.5 | 31.8 | Very Good |
| 2 | Ti | 52.9 | $2.1 \times 10^{-5}$ | 5.6 | 50.2 | 32.9 | Good |
| 3 | Si | 53.0 | $1.9 \times 10^{-5}$ | 5.6 | 51.2 | 32.5 | Very Good |
| 4 | Ge | 52.4 | $2.4 \times 10^{-5}$ | 5.4 | 50.1 | 34.7 | Very Good |
| 5 | Ta | 52.1 | $2.6 \times 10^{-5}$ | 5.6 | 51.8 | 31.5 | Good |

FIG. 10

$(ZrO_{2-x}N_x)_{1-y}((Y_2O_3)_{1-z}(Nb_2O_5)_z)_y$

| Sample No. | (x, y, z) | ER[dB] Constant velocity | ER[dB] Double velocity | ER[dB] Fourfold velocity | Total evaluation |
|---|---|---|---|---|---|
| 1 | (0.05, 0.05, 0) | 34.9 | 34.1 | 32 | Very Good |
| 2 | (0.01, 0.05, 0) | 30.1 | 30.3 | 30.3 | Good |
| 3 | (0.06, 0.05, 0) | 34.2 | 35.2 | 34.3 | Very Good |
| 4 | (0.2, 0.05, 0) | 32.8 | 32.9 | 32.2 | Good |
| 5 | (0.5, 0.05, 0) | 36.2 | 34.5 | 33.4 | Very Good |
| 6 | (0.05, 0.1, 0) | 33.2 | 32.2 | 30.3 | Good |
| 7 | (0.05, 0.05, 1) | 33.9 | 31.7 | 30.5 | Good |
| 8 | (0.05, 0.05, 0.1) | 31.3 | 30.8 | 30.1 | Good |

FIG. 11

| No. | Composition of recording film | CNR[dB] | SbER | Total evaluation |
|---|---|---|---|---|
| 1 | Ge10Sb2Te13 | 52.8 | $2.2 \times 10^{-5}$ | Good |
| 2 | Ge4Sb2Te7 | 52.2 | $2.2 \times 10^{-5}$ | Good |
| 3 | Ge8Sb2Te13Bi2 | 53.7 | $1.8 \times 10^{-5}$ | Very Good |
| 4 | Ge3Sb2Te7Bi | 54.4 | $2.1 \times 10^{-5}$ | Very Good |
| 5 | Ge6Sb2Te13Sn4 | 52.2 | $1.9 \times 10^{-5}$ | Good |
| 6 | Ge3Sb2Te7Sn | 52.8 | $2.4 \times 10^{-5}$ | Good |
| 7 | Ge10Bi2Te13 | 53.6 | $2.2 \times 10^{-5}$ | Very Good |
| 8 | Ge2.9BiTe4.4 | 53.1 | $2.4 \times 10^{-5}$ | Very Good |
| 9 | Ge11.25BiTe12.75 | 53.6 | $2.2 \times 10^{-5}$ | Very Good |
| 10 | Ge10Sb1.2In0.8Te13 | 55.8 | $3.4 \times 10^{-6}$ | Very Good |
| 11 | Ge10Bi1.5In0.5Te13 | 55.6 | $2.9 \times 10^{-6}$ | Very Good |
| 12 | Ge4Sb1.5In0.5Te7 | 54.2 | $3.6 \times 10^{-6}$ | Very Good |
| 13 | Ge2.9Bi0.75In0.25Te4.4 | 55.1 | $2.9 \times 10^{-6}$ | Very Good |

FIG. 12

| No. | Composition of recording film | CNR[dB] | SbER | Total evaluation |
|---|---|---|---|---|
| 1 | Ge10Sb2Te13+N(3at.%) | 54.8 | $3.3 \times 10^{-5}$ | Good |
| 2 | Ge4Sb2Te7+N(3at.%) | 55.2 | $3.4 \times 10^{-5}$ | Good |
| 3 | Ge4Sb2Te7+N(5at.%) | 54.7 | $2.1 \times 10^{-5}$ | Very Good |
| 4 | Ge8Sb2Te13Bi2+N(3at.%) | 55.4 | $2.3 \times 10^{-5}$ | Very Good |
| 5 | Ge3Sb2Te7Bi+N(3at.%) | 54.2 | $3.6 \times 10^{-5}$ | Good |
| 6 | Ge10Bi2Te13+N(1at.%) | 55.8 | $3.4 \times 10^{-5}$ | Good |
| 7 | Ge10Bi2Te13+N(2.5at.%) | 55.6 | $2.9 \times 10^{-5}$ | Very Good |
| 8 | Ge2.9BiTe4.4+N(1at.%) | 55.1 | $2.9 \times 10^{-5}$ | Very Good |
| 9 | Ge11.25BiTe12.75+N(3at.%) | 55.6 | $2.9 \times 10^{-5}$ | Very Good |
| 10 | Ge10Sb1.2In0.8Te13+N(1at.%) | 52.8 | $2.4 \times 10^{-6}$ | Very Good |
| 11 | Ge10Bi1.5In0.5Te13+N(3at.%) | 53.6 | $2.2 \times 10^{-6}$ | Very Good |
| 12 | Ge4Sb1.5In0.5Te7+N(3at.%) | 52.2 | $2.2 \times 10^{-6}$ | Very Good |
| 13 | Ge2.9Bi0.75In0.25Te4.4+N(2.5at.%) | 53.7 | $1.8 \times 10^{-6}$ | Very Good |

FIG. 13

| Comparative example | Arrangement | Extinction coefficient |
|---|---|---|
| Comparative example1 | Cr2O3 | 0.28 |
| Comparative example2 | SiC | 1.81 |
| Comparative example3 | None | --- |
| Comparative example4 | Ta2O5+SiC | 0.11 |
| Comparative example5 | GeN | 0.18 |
| Comparative example6 | GeCrN | 0.20 |

FIG. 14

| Comparative example | Arrangement | CNR [dB] | SbER | Pw[mW] (L1) | T[%] (L0) | ER [dB] | Total evaluation |
|---|---|---|---|---|---|---|---|
| Comparative example 1 | Cr2O3 | 45.8 | Immeasurable | 12 | 39 | 20 | NG |
| Comparative example 2 | SiC | 48.8 | $5.0 \times 10^{-4}$ | 8 | 42 | 25 | NG |
| Comparative example 3 | None | 50.9 | $3.3 \times 10^{-3}$ | 5.2 | 45 | 19 | NG |
| Comparative example 4 | Ta2O5+SiC | 50.1 | $2.8 \times 10^{-4}$ | 6.2 | 46 | 28 | NG |
| Comparative example 5 | GeN | 49.9 | $3.9 \times 10^{-4}$ | 6.5 | 44 | 27 | NG |
| Comparative example 6 | GeCrN | 47.4 | $4.5 \times 10^{-4}$ | 6.6 | 45 | 25 | NG |

FIG. 15

| Comparative example | Interface layer | ER[dB] Constant velocity | ER[dB] Double velocity | ER[dB] Fourfold velocity | Total evaluation |
|---|---|---|---|---|---|
| Comparative example 1 | Cr2O3 | 20 | 17 | 9 | NG |
| Comparative example 4 | Ta2O5+SiC | 28 | 22.6 | 11.3 | NG |

FIG. 16

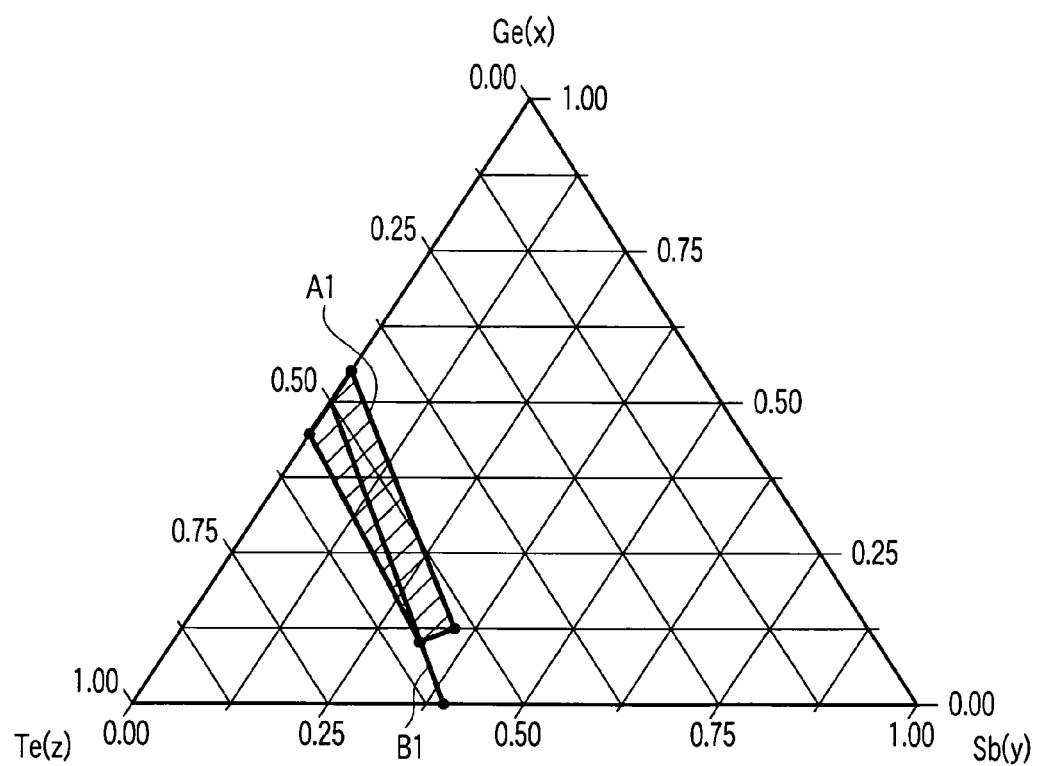
F I G. 1 7

OPTICAL RECORDING MEDIUM, AND INFORMATION RECORDING/PLAYBACK APPARATUS AND METHOD USING THE MEDIUM

CROSS-REFERENCE TO RELATED APPLICATIONS

This application is based upon and claims the benefit of priority from Japanese Patent Application No. 2005-168344, filed Jun. 8, 2005, the entire contents of which are incorporated herein by reference.

BACKGROUND

1. Field

One embodiment of the invention relates to a recordable and/or erasable information recording medium. This embodiment particularly relates to an optical recording medium having one or more recording films configured to record information by using a phase change. More specifically, the embodiment relates to a single-sided, multi-layer phase change optical disc suitable for repetitive recording/playback of large-volume digital data such as high-resolution video information.

Or, one embodiment of the invention relates to an optical recording medium which records information by reversibly changing a state by emitting a light beam. This embodiment particularly relates to a phase change optical recording medium in which the atomic arrangement of a thin film for holding information changes between an amorphous state and crystalline state, thereby causing a state change for information recording.

2. Description of the Related Art (Phase Change Optical Recording Principle)

In a general phase change optical recording film, a portion heated to a melting point or more melts, and this melted portion takes an amorphous atomic arrangement when rapidly cooled. Also, when the film is held in the temperature region of a crystallization temperature which is below the melting point for a predetermined time or more, the film remains in a crystalline state if it is initially crystal, but crystallizes if it is initially amorphous (a solid phase erase mode). Depending on the material of the recording film, it is also possible to crystallize the recording film by melting a portion near a non-crystal portion of the recording film by heating the portion to a melting point or more, and slowly cooling the melted portion (a melt erase mode).

Since the intensity of reflected light from an amorphous portion and that of reflected light from a crystal portion are different, the intensity of reflected light is converted into that of an electrical signal, and information is read out by A/D-converting the electrical signal. This is the principle of the phase change optical recording medium. It is also possible to record and read out information by using a change between a metastable crystal phase such as a martensite phase and a stable crystal phase, or a change between a plurality of metastable crystal phases, instead of the crystal-amorphous phase change.

(Method of Increasing Density)

The following two methods can be used to increase the amount of information recordable on one recording medium, i.e., increase the recording capacity. One is a method which reduces the pitch of recording marks in a track direction. If the degree of downsizing advances, however, the pitch size reaches a region smaller than the size of a playback light beam, so a playback beam spot may temporarily include two recording marks. If the recording marks are well separated from each other, a playback signal is largely modulated, and a signal having a large amplitude is obtained. However, if the recording marks are close to each other, a signal having a small amplitude is obtained, so an error easily occurs when the signal is converted into digital data.

The other method of increasing the recording density is to reduce the track pitch. This method can increase the recording density without being largely influenced by the reduction in signal intensity caused by downsizing of the mark pitch described above. Unfortunately, this method has the problem that in a region where the track pitch is equal to or smaller than the size of a light beam, information on a certain track deteriorates while write or erase is performed on an adjacent track. That is, so-called cross erase occurs.

The causes of the cross erase are that a mark is directly irradiated with the outer edge of a laser beam on an adjacent track, and that a hot stream during recording flows into an adjacent track and raises the temperature of a mark on the adjacent track, thereby deteriorating the shape of the mark. These problems have to be solved to increase the density of the phase change optical recording medium. Also, to accurately read a downsized mark and decrease the probability of a read error, it is desirable to minimize the noise component by smoothing the shape of the outer edge of a recording mark to be formed.

(Method of Increasing Capacity by Multi-Layer Medium)

Another method of increasing the capacity is to stack a plurality of layers for holding information. This method is disclosed in Jpn. Pat. Appln. KOKAI Publication No. 2000-322770 (a dual-layer RAM system). A medium having two stacked layers and designed to be readable and writable from one side is called a single-sided, dual-layer medium or simply called a dual-layer medium. In this single-sided, dual-layer medium, an information layer (to be referred to as L0 hereinafter) formed close to the light incident side has to ensure a transmittance of approximately 50[%] or more so as not to attenuate light excessively in L0 when an information layer (to be referred to as L1 hereinafter) formed far from the light incident side is accessed. To this end, the thickness of the recording film has to be as very small as 10 nm or less in L0.

Decreasing the film thickness prolongs the holding time for crystallization, and produces unerased information at a normal recording speed. "Manuscripts for The 12th Phase Change Recording Research Meeting Symposium (Proceedings of PCOS2000) pp. 36-41" discloses that a method of substituting a portion of a GeSbTe recording film with Sn is effective as a measure to counter this problem. Also, Jpn. Pat. Appln. KOKAI Publication No. 2001-232941 (a GeSbTeBi series) discloses that substituting a portion of a GeSbTe recording film with Bi, In, Sn, or Pb is similarly effective. To ensure the erase ratio described above, however, improvements of the recording film material are unsatisfactory, and a film having a crystallization promoting effect is formed in the interface with the recording film.

According to "Manuscripts for The 12th Phase Change Recording Research Meeting Symposium", germanium nitride (GeN) is effective. However, the inventors made extensive studies, and found that when a very thin film made of the recording film material described above and having a thickness of 10 nm or less is combined with the conventional interface film material such as GeN, the cross erase described previously occurred, so the track pitch could not be decreased. Also, when silicon carbide (SiC) reportedly having a crystallization promoting function is used, the extinction coefficient of light is large at a wavelength of 405 nm of a laser beam used for the next-generation, high-density optical disc, and this produced a very large optical loss. In addition, germanium nitride (GeN) or silicon nitride ($SiN_x$) also produced an optical loss.

On the other hand, in a medium having no interface film, it is possible to suppress recrystallization of the melted portion and reduce the cross erase, but the erase ratio is totally unsatisfactory. Furthermore, recording and erase have to be performed on L1 by using a laser beam attenuated to approximately a half beam by passing through L0. Therefore, it is very important to decrease the optical loss in an interface layer or dielectric layer, in order to meet the requirements for a high density of the medium and increase the utilization ratio of the emitted laser beam at the same time.

(Method of High-Speed Recording)

High-speed recording is another requirement for phase change optical recording. When an image is to be recorded, for example, if the image can be recorded within a time shorter than the actual playback time, it is readily possible to realize a so-called time shift function (time slip playback) by which a user can view previous images by tracing back the time during dubbing of a distributed medium or recording of broadcast. One main cause which prevents high-speed recording in phase change recording is the problem that information is kept unerased when crystallization is performed by a laser having a relatively low erase level during overwrite, i.e., the problem of an insufficient erase ratio. This problem arises because a recording mark rapidly passes through a laser spot and hence does not stay in a temperature region capable of crystallization for a sufficiently long time, so information is kept unerased.

Jpn. Pat. Appln. KOKAI Publication No. 11-213446 discloses a method which raises the erase speed by promoting crystallization by forming a material such as GeN in the interface with a recording film. However, when the inventors conducted experiments by using the material disclosed in Jpn. Pat. Appln. KOKAI Publication No. 11-213446 as an interface film, a part of a portion melted during recording recrystallized, i.e., to form a recording mark having a necessary size, a range larger than the recording mark has to be melted. The use of an interface film like this melts an unwanted large region, and consequently accelerates the cross erase. Accordingly, this method has an adverse effect from the viewpoint of high-density recording.

In other words, when the material disclosed in Jpn. Pat. Appln. KOKAI Publication No. 11-213446 is used as an interface film and information is recorded by a laser power within a range which is allowable in respect of the cross erase, the width of the formed recording mark decreases, and this lowers the obtained signal-to-noise ratio (or carrier-to-noise ratio: CNR). On the other hand, in a medium having no interface film, it is possible to suppress recrystallization of the melted portion and reduce the cross erase, but the erase ratio is totally unsatisfactory. That is, a new interface film material capable of raising the crystallization rate during erase (ensuring a necessary erase ratio even in high-speed recording) and also capable of suppressing recrystallization of the melted portion during recording (reducing the cross erase) is desired.

(Film Design of Phase Change Optical Recording Medium)

As explained in "phase change optical recording principle", in the phase change optical recording medium, an amorphous mark is formed, i.e., data is written in a desired portion of a recording film by emission of a laser pulse, and data is erased by crystallization by irradiating an amorphous mark with a low-power laser. In the data write, an amorphous mark is formed by rapidly cooling a portion irradiated with the laser. In the data erase, an amorphous portion is crystallized by slow cooling. If the recording film has a high laser absorbance, operations such as recording and erase can be performed with a low laser power. If this absorbance is low, a high laser power is needed for recording and erase. This absorbance in the recording film is determined by the optical characteristics and thermal characteristics of the individual film materials of the medium formed by a multi-layer film. For example, the arrangement can be changed by selecting film materials equal in absorbance, and it is possible to produce anisotropy in thermo-physical properties between a rapid-cooling structure and slow-cooling structure, or between the longitudinal direction and sectional direction of the film.

That is, film design of the phase change optical recording medium includes optical design and thermal design. The optical design requires the optical characteristics of each thin film. The thermal design requires the thermo-physical properties including, e.g., the melting point, melt latent heat, and crystallization temperature of each thin film. The optical constant of a thin film can be measured by using a device such as an ellipsometer. However, it is impossible to systematically measure the thermo-physical properties of a thin film on the nanometer order while removing the effects of other factors, although several researches suggested that they are different from bulk thermo-physical properties. Therefore, experimental parameters are needed to correct these properties. In particular, there is almost no method of measuring the boundary thermal resistance between thin films on the nanometer order. The inventors made extensive studies on these problems as well, and have established a thermal design method in which the thermo-physical properties of thin films and the boundary thermal resistance between them measured by a highly precise method are taken into consideration by thermal design, thereby completing the invention.

(Interface Layer Materials)

As a known technique which can be another interface layer material having a crystallization promoting function differing from GeN, there is a technique which mixes a carbide or nitride in several oxides such as $Ta_2O_5$ to form a sulfur (S)-free protective film material (Jpn. Pat. Appln. KOKAI Publication No. 2003-006794). This invention disclosed in Jpn. Pat. Appln. KOKAI Publication No. 2003-006794 has its main purpose to improve the current DVD using a laser diode (LD) having wavelength λ=650 nm. Therefore, the material of Jpn. Pat. Appln. KOKAI Publication No. 2003-006794 becomes opaque at wavelength λ=405 nm of the next-generation blue LD. Since the optical loss increases, this material cannot be used in the next-generation, high-density medium. GeN described previously is not also transparent at wavelength λ=405 nm, and increases the optical loss.

As a known technique of an interface layer material containing $ZrO_2$, there is a technique related to $(ZrO_2)_M (Cr_2O_3)_{100-M}$, i.e., a Zr—Cr—O series (Jpn. Pat. Appln. KOKAI Publication No. 2003-323743). $Cr_2O_3$ mixed in the material series of Jpn. at. Appln. KOKAI Publication No. 2003-323743 is a material having a very large extinction coefficient in the wavelength region of visible light. Even when the amount of material is small, therefore, a thin film having a relatively large extinction coefficient forms if the material is used as the material mixture contained in the film. As described above, none of the presently known techniques can provide an interface layer material which is optically transparent at a wavelength of 405 nm or less and has the crystallization promoting function.

(Material Series of Recording Film)

A eutectic recording film uses the melt erase mode in the erase process as described earlier, so a cap layer need not have the crystallization promoting function. Therefore, details such as the film material and micro-structure have not been studied. In addition, when the eutectic series is used, it is very difficult to perform so-called land-groove recording by which information is recorded on and played back from both a land (L) and groove (G), since the melt erase mode is used as described above. This makes the eutectic series very disadvantageous in increasing the recording density. By contrast, a so-called pseudo-binary recording film material such as $Ge_2Sb_2Te_5$ has a performance capable of rapidly changing the phase from an amorphous state to a crystalline state in a solid-phase state (a solid phase erase mode). If the recording film is thin, however, the time needed for crystallization becomes relatively long, so it is indispensable to use an interface layer material having the crystallization promoting function. This can also realize land-groove recording.

That is, the data erase process when the eutectic recording film material is used and that when the pseudo-binary recording film material is used are entirely different as phenomena. Accordingly, characteristics required of a cap layer are different from functions such as the crystallization promoting function required of an interface layer. From the foregoing, it is naturally necessary to select an appropriate film material to provide a suitable interface layer material, but details such as the micro-structure and composition have to be further studied.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary view showing the correspondence of the compositions (x, y, z) of compounds $(ZrO_{2-x}N_x)_{1-y}((Y_2O_3)_{1-z}(Nb_2O_5)_z)_y$ used in an interface layer of an optical recording medium according to an embodiment of the invention and the sample numbers (different from sample numbers in other drawings);

FIG. 5 is an exemplary view showing the correspondence of compounds which are used in an interface layer of an optical recording medium according to an embodiment of the invention, and to which various sixth elements are added, and the sample numbers (different from sample numbers in other drawing);

FIG. 6 is an exemplary view showing the correspondence of favorable compositions of a recording film of an optical recording medium according to an embodiment of the invention and the sample numbers (different from sample numbers in other drawings);

FIG. 7 is an exemplary view for explaining the evaluation conditions of an optical recording medium according to an embodiment of the invention;

FIG. 8 is an exemplary view for explaining the performances of embodiments (the second, fourth, and fifth embodiments) when the composition (x, y, z) of a compound $(ZrO_{2-x}N_x)_{1-y}((Y_2O_3)_{1-z}(Nb_2O_5)_z)_y$ used in an interface layer is (0.05, 0.05, 0);

FIG. 9 is an exemplary view for explaining the performances of samples 1 to 13 when the composition (x, y, z) of a compound $(ZrO_{2-x}N_x)_{1-y}((Y_2O_3)_{1-z}(Nb_2O_5)_z)_y$ used in an interface layer is variously changed in the third embodiment;

FIG. 10 is an exemplary view for explaining the performances of samples 1 to 5 when the type of sixth element to be added is changed in the sixth embodiment;

FIG. 11 is an exemplary view for explaining the performances of samples 1 to 8 when the composition (x, y, z) of a compound $(ZrO_{2-x}N_x)_{1-y}((Y_2O_3)_{1-z}(Nb_2O_5)_z)_y$ used in an interface layer is variously changed;

FIG. 12 is an exemplary view for explaining the performances of samples 1 to 9 when the composition of a recording film is variously changed;

FIG. 13 is an exemplary view for explaining the performances of samples 1 to 9 when the combination of the composition and nitrogen addition amount of a recording film is variously changed;

FIG. 14 is an exemplary view for explaining Comparative Examples 1 to 6 related to an extinction coefficient when the arrangement of an interface layer is variously changed;

FIG. 15 is an exemplary view for explaining the performances of Comparative Examples 1 to 6 when the arrangement of the interface layer is variously changed;

FIG. 16 is an exemplary view for explaining erase characteristics when the recording speed is changed in Comparative Examples 1 and 4 when the arrangement of the interface layer is changed;

FIG. 17 is an exemplary GeSbTe ternary phase diagram for explaining a favorable composition range of a recording film of an optical recording medium according to an embodiment of the invention;

DETAILED DESCRIPTION

An optical recording medium according to one embodiment of the invention comprises a substrate, a recording film formed on the substrate, and an adjacent layer adjacent to the recording film. The recording film is configured to reversibly change an atomic arrangement. The adjacent layer may contain zirconium Zr, oxygen O, and nitrogen N as a part of a composition thereof. The optical recording medium is thus configured to reversibly perform recording and/or erase on the recording film by using light.

According to embodiments of the invention, it is possible to obtain at least one of:

(1) a new interface film material capable of raising the crystallization rate during erase (ensuring a high erase ratio even in high-speed recording), and also capable of suppressing recrystallization of a melted portion during recording (reducing cross erase);

(2) an interface layer material which is optically transparent at a wavelength of 405 nm or less and has a crystallization promoting function; and (3) a recording film material matching the above-mentioned interface layer material (e.g., having a high optical contrast between a crystalline state and amorphous state at a wavelength used).

Embodiments of the invention can implement a high-density, large-capacity phase change recording medium capable of high-speed overwrite. This recording medium hardly recrystallizes a melted region during recording, thereby reducing cross erase which readily interferes with land-groove recording. The recording medium also has a high contrast and a high carrier-to-noise ratio (CNR), has a sufficiently high erase ratio at a high linear velocity, and has good overwrite (OW) cycle characteristics and a high environmental resistance. Embodiments of the invention can also implement a dual-layer or multi-layer medium including these characteristics.

In an optical recording medium according to an embodiment of the invention, an adjacent layer (interface layer) made of Zr (zirconium), O (oxygen), N (nitrogen), and one or both of Y (yttrium) and Nb (niobium) is formed in contact with a phase change optical recording film.

Figure 1:
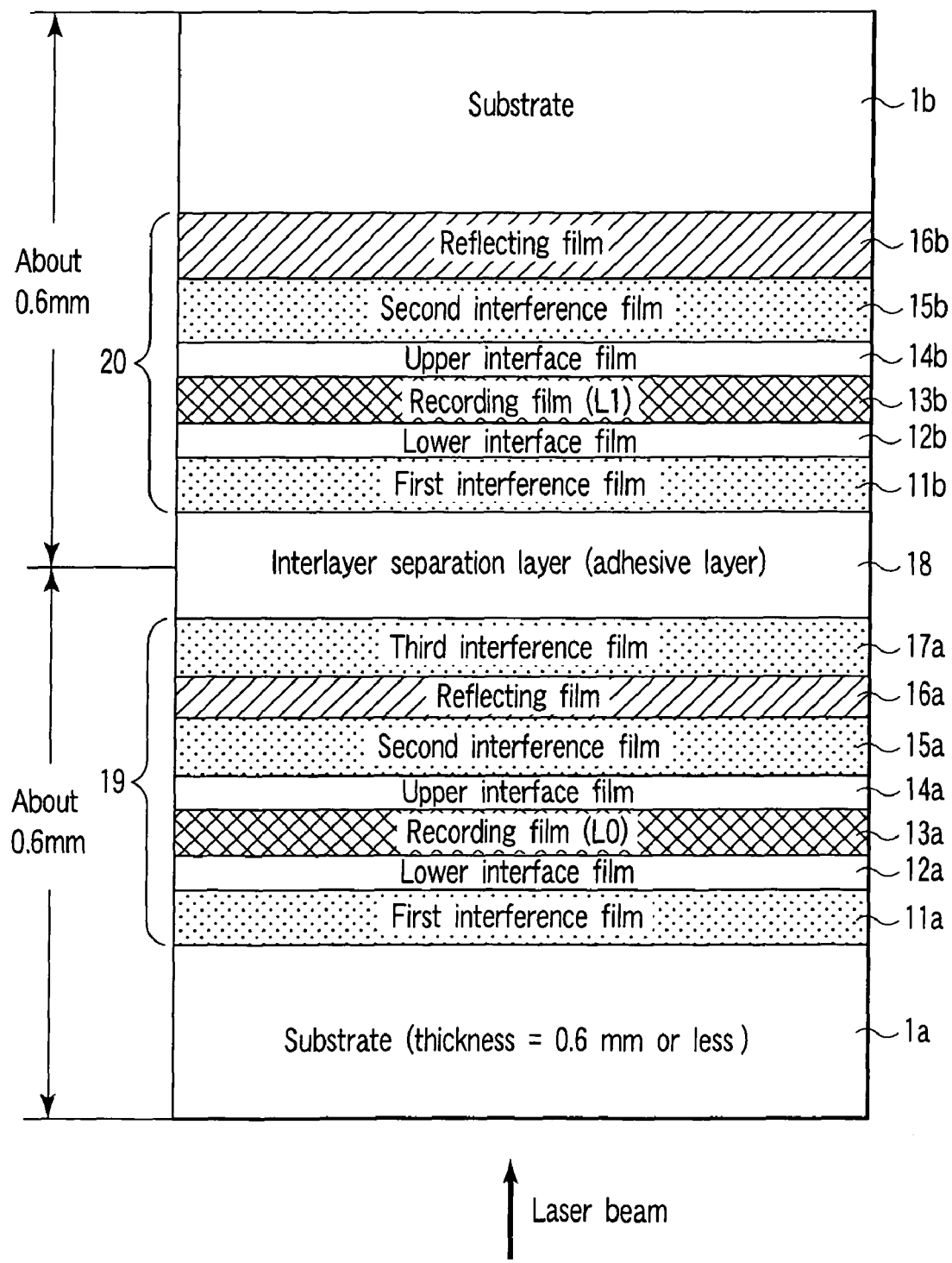
FIG. 1 is an exemplary view for explaining the sectional structure of an optical recording medium (Example 1) according to an embodiment of the invention.

Optical recording media according to various embodiments of the invention will be explained below. FIG. 1 is a view for explaining the sectional structure of an optical recording medium (Example 1) according to an embodiment of the invention. In this example, substrate $1a$ which is transparent to a laser beam and made of, e.g., polycarbonate (PC) is formed on the laser beam incident side. L0 information layer 19 is formed on the side of substrate $1a$ away from its laser-receiving surface. Substrate $1b$ having a similar arrangement is separately prepared, and L1 information layer 20 is formed on substrate $1b$. L0 information layer 19 of substrate $1a$ and L1 information layer 20 of substrate $1b$ are adhered via interlayer separation layer 18 made of a transparent adhesive (e.g., an ultraviolet-curing resin) having the same refractive index as that of substrate $1a$, thereby forming a single-sided, dual-layer optical disc having a total thickness of 1.2 mm.

L0 information layer 19 of substrate $1a$ is formed by sequentially stacking first interference film $11a$, lower interface film $12a$, recording film $13a$, upper interface film $14a$, second interference film $15a$, reflecting film $16a$, and third interference film $17a$. L1 information layer 20 of substrate $1b$ is formed by sequentially stacking reflecting film $16b$, second interference film $15b$, upper interface film $14b$, recording film $13b$, lower interface film $12b$, and first interface film $11b$.

<A> In this arrangement, interface films $12a$, $12b$, $14a$, and/or $14b$ can be formed of compounds having the following compositions or characteristics:

(1) Zirconium Zr, oxygen O, nitrogen N, and one or both of yttrium Y and niobium Nb;

(2) Zirconium Zr, oxygen O, and nitrogen N (N is placed by substituting the site of O);

(3) When the composition of the interface layer is represented by $(ZrO_{2-x}N_x)_{1-y}((Y_2O_3)_{1-z}(Nb_2O_5)_z)_y$, the composition ratio is preferably $0<x\leq 0.5$, $0<y\leq 0.1$, and $0\leq z\leq 1$, and more preferably, $0<x\leq 0.2$, $0<y\leq 0.1$, and $0\leq z\leq 1$.

(4) When the wavelength of a laser beam is $\lambda$, the composition ratio (x, y, z) of $(ZrO_{2-x}N_x)_{1-y}((Y_2O_3)_{1-z}(Nb_2O_5)_z)_y$ is so determined that the extinction coefficient (FIG. 3) of the interface layer is preferably $1\times 10^{-2}$ or less, and more preferably, $1\times 10^{-3}$ or less within the range of 250 nm$\leq\lambda\leq$1,000 nm;

(5) In addition to zirconium Zr, oxygen O, nitrogen N, and one or both of yttrium Y and niobium Nb, at least one of the following elements is further contained:

hafnium Hf, titanium Ti, tantalum Ta, germanium Ge, silicon Si, cerium Ce, and magnesium Mg.

<B> Recording film $13a$ and/or $13b$ can be formed of compounds having the following compositions or characteristics.

(11) The recording film contains at least germanium Ge, antimony Sb, and tellurium Te, and, when the composition of the recording film is represented by $Ge_xSb_yTe_z$ wherein x+y+z=100, the recording film is so configured as to have a composition [A1] in an area defined by x=55·z=45, x=45·z=55, x=10·y=28·z=42, and x=10·y=36·z=54 on a GeSbTe ternary phase diagram (FIG. 17) or a composition [B1] above the area;

(12a) When the composition of the recording film is partially substituted by bismuth Bi and/or tin Sn and the substituted composition is represented by $(Ge_w Sn_{(1-w)})_x (Sb_v Bi_{(1-v)})_y Te_z$ wherein x+y+z=100, w and v in this composition satisfy $0\leq w<0.5$ and $0\leq v<0.7$.

(12b) Or, when the composition of the recording film is partially substituted by bismuth Bi and/or tin Sn and the substituted composition is represented by $(Ge_{(1-w)} Sn_w)_x(Sb_v Bi_{(1-u)} In_u)_{(1-v)})_y Te_z$ wherein x+y+z=100, w, v and u in this composition satisfy $0\leq w<0.5$ and $0\leq v<0.7$ and $0\leq u\leq 1$.

(13) The recording film contains at least germanium Ge, bismuth Bi, and tellurium Te, and, when the composition of the recording film is represented by $Ge_xBi_yTe_z$ wherein $x+y+z=100$, the recording film is so configured as to have a composition [A2] in an area defined by $x=55\cdot z=45$, $x=45\cdot z=55$, $x=10\cdot y=28\cdot z=42$, and $x=10\cdot y=36\cdot z=54$ on a GeBiTe ternary phase diagram (FIG. 18) or a composition [B2] above the area;

(14) The recording film contains at least germanium Ge, antimony Sb, tellurium Te, and nitrogen N, and, when the composition of Ge, Sb, and Te is represented by $Ge_xSb_yTe_z$ wherein $x+y+z=100$, the recording film is so configured as to have a composition [A1] in an area defined by $x=55\cdot z=45$, $x=45\cdot z=55$, $x=10\cdot y=28\cdot z=42$, and $x=10\cdot y=36\cdot z=54$ on a GeSbTe ternary phase diagram (FIG. 17) or a composition [B1] above the area, and 1 to 5 at. % of nitrogen N is added to the GeSbTe-based compound having the above composition;

(15a) When the composition of the recording film is partially substituted by bismuth Bi and/or tin Sn and the substituted composition is represented by $(Ge_w Sn_{(1-w)})_x(Sb_v Bi_{(1-v)})_y Te_z$ wherein $x+y+z=100$, w and v in this composition satisfy $0 \leq w < 0.5$ and $0 \leq v < 0.7$, and 1 to 5 at. % of nitrogen N is added to the GeSnSbTe-, GeSbTeBi-, or GeSnSbTeBi-based compound having the above composition.

(15b) Or, when the composition of the recording film is partially substituted by bismuth Bi and/or tin Sn and the substituted composition is represented by $(Ge_{(1-w)} Sn_w)_x(Sb_v (Bi_{(1-u)} In_u)_{(1-v)})_y Te_z$ wherein $x+y+z=100$, w, v and u in this composition satisfy $0 \leq w < 0.5$ and $0 \leq v < 0.7$ and $0 \leq u \leq 1$, and 1 to 5 at. % of nitrogen N is added to the GeSnSbTe-, GeSbTeBi-, GeSnSbTeIn-, GeSbTeIn-, GeSbTeBiIn-, GeSbSnTeBiIn-, GeSnSbTeBiIn- or GeSnSbTeBi-based compound having the above composition.

(16) The recording film contains at least germanium Ge, bismuth Bi, tellurium Te, and nitrogen N, and, when the composition of Ge, Bi, and Te is represented by $Ge_xBi_yTe_z$ wherein $x+y+z=100$, the recording film is so configured as to have a composition [A2] in an area defined by $x=55\cdot z=45$, $x=45\cdot z=55$, $x=10\cdot y=28\cdot z=42$, and $x=10\cdot y=36\cdot z=54$ on a GeBiTe ternary phase diagram (FIG. 18) or a composition [B2] above the area, and 1 to 5 at. % of nitrogen N is added to the GeBiTe-based compound having the above composition.

Note that the arrangement of the phase change optical recording medium according to the embodiment of the invention is not limited to that shown in FIG. 1. For example, another dielectric film may also be formed between second interference film 15a/15b and reflecting film 16a/16b. All the interference films may also be omitted by replacing them with the material of the interface film. It is also possible to omit the reflecting films. Each reflecting film may also be formed by a plurality of metal films. A dielectric film may also be formed on each reflecting film.

In a dual-layer medium, first information layer 19 close to the light incident surface and having the above arrangement and second information layer 20 far from the light incident surface and having the above arrangement are formed, and these two information layers are adhered by an adhesive layer to obtain an interlayer separation structure. This similarly applies to a multi-layer medium having three or more layers.

It is also possible to form various films on a substrate and adhere a thin transparent sheet about 0.1 mm thick on the substrate, thereby obtaining a medium which receives light through this transparent sheet (this medium assumes the use of an objective lens having a high NA of about 0.85) (specific examples will be described later with reference to the drawing from FIG. 25). This is so because there are no big differences between the intended characteristics of the recording films, interface layer materials, protective film materials, and reflecting film materials used regardless of whether a thin transparent cover layer about 0.1 mm thick or a 0.6-mm thick transparent substrate is used on the light incident side.

The characteristic feature of this embodiment is that the interface film is made of Zr (zirconium), O (oxygen), N (nitrogen), and one or both of Y (yttrium) and Nb (niobium). The interface film is more preferably a compound which is made of Zr, O, N, and one or both of Y and Nb, and in which N is placed by substituting the site of O. The characteristic feature of the invention is particularly notable in a case in which, when the interface film is made of Zr, O, N, and one or both of Y and Nb and the composition is represented by $(ZrO_{2-x}N_x)_{1-y}((Y_2O_3)_{1-z}(Nb_2O_5)_z)_y$, the composition ratio is preferably $0 < x \leq 0.5$, $0 < y \leq 0.1$, and $0 \leq z \leq 1$, and more preferably, $0 < x \leq 0.2$, $0 < y \leq 0.1$, and $0 \leq z < 1$.

Note that Hf (hafnium) and Ti (titanium) in the same group as Zr are known as unavoidable elements difficult to separate in the process of purifying Zr. The effects of the invention do not significantly deteriorate even if slight amounts of these unavoidable elements are mixed. To increase the stability of the film, it is effective to add one or more types of elements selected from Ge (germanium), Si (silicon), Ta (tantalum), Ce (cerium), and Mg (magnesium), in addition to the unavoidable elements. The addition of, e.g., $Y_2O_3$ is effective presumably because $ZrO_2$ has both a low-temperature phase and high-temperature phase and the difference between the thermal expansion coefficients of these phases makes the material unstable. On the other hand, Zr is an element which oxidizes very easily, and probably takes oxygen from Y. To further increase the stability, therefore, it is effective to add Hf and Ti which are elements in the same group as Zr and easily oxidize similarly to Zr, and further add one or more types of elements selected from Ge, Si, Ta, Ce, and Mg.

The effect of the interface film of the invention is significant when the recording film is made of a GeSbTe-based material, and the composition of the recording film used in practicing the invention contains a so-called pseudo-binary composition represented by (GeTe)—(Sb$_2$Te$_3$) and its vicinity. The effect is particularly remarkable when the interface film of the invention is used for an alloy recording film material containing the composition (GeTe)—(Sb$_2$Te$_3$) described above and its vicinity in which the composition ratio of Ge is 30 at. % or more.

The effect is more noticeable when the interface film is used as a composition obtained by partially substituting Ge with Sn or partially substituting Sb with Bi and/or In in the composition GeSbTe described above. In this case, the substitution ratio of Sn to Ge is preferably Sn/Ge<0.5, and that of Bi to Sb is preferably Bi/(Bi+Sb)<0.7.

Here, 0.5 or less is suitable for the rate of In to the quantity of Sb or Bi, and 0.25 or less is more suitable. The quantity of the substitution element closely relates to crystallization temperature, melting temperature, and/or crystallization promotion function. Although the optimal conditions may change with designs of a medium, it is recommendable to use the rate within the above range (i.e., less than or equal to 0.5 or 0.25).

The effect of the interface film of the invention is significant when the recording film is made of GeBiTe, and a so-called pseudo-binary composition represented by (GeTe)—(Bi$_2$Te$_3$) and its vicinity are used. The effect is particularly significant when the interface film of the invention is used for an alloy recording film material containing the composition (GeTe)—(Bi$_2$Te$_3$) described above and its vicinity in which the composition ratio of Ge is 30 at. % or more.

(Nitriding of Each Recording Film)

When the recording film contains nitrogen (N), the composition is represented by (GeTe)—(Sb$_2$Te$_3$)—N, i.e., the composition is obtained by adding nitrogen (N) to (GeTe)—(Sb$_2$Te$_3$). That is, the composition is obtained by adding nitrogen (N) to a pseudo-binary series represented by (GeTe)—(Sb$_2$Te$_3$). This composition can be more simply represented by GeSbTe—N. The effect of the interface film of the invention is remarkable when it is used together with this recording film. The effect is particularly notable when the interface film of the invention is used for an alloy recording film material containing the composition (GeTe)—(Sb$_2$Te$_3$) described above and its vicinity in which the composition ratio of Ge is 30 at. % or more.

The effect is further enhanced when the interface film is used for a composition obtained by partially substituting Ge with Sn or partially substituting Sb with Bi and/or In in the composition GeSbTe—N described above. In this case, the substitution ratio of Sn to Ge is preferably Sn/Ge<0.5, and that of Bi to Sb is preferably Bi/(Bi+Sb)<0.7.

Here, 0.5 or less is suitable for the rate of In to the quantity of Sb or Bi, and 0.25 or less is more suitable. The quantity of the substitution element closely relates to crystallization temperature, melting temperature, and/or crystallization promotion function. Although the optimal conditions may change with designs of a medium, it is recommendable to use the rate within the above range (i.e., less than or equal to 0.5 or 0.25).

Also, the effect of the interface film of the invention is noticeable when the recording film has a composition obtained by adding nitrogen (N) to (GeTe)—(Sb$_2$Te$_3$), i.e., a so-called pseudo-binary composition represented by (GeTe)—(Bi$_2$Te$_3$)—N and its vicinity (this composition is more simply represented by GeBiTe—N). The effect is particularly noticeable when the interface film of the invention is used for an alloy recording film material containing the composition (GeTe)—(Bi$_2$Te$_3$) described above and its vicinity in which the composition ratio of Ge is 30 at. % or more.

Although the effects of the invention appear regardless of the film thickness of the recording film, the effects are more remarkable when the film thickness is 20 nm or less, preferably, 10 nm or less.

The effects of the invention are also enhanced when the invention is used as a recording film in a layer close to the light incident side in a recording medium which allows light from one surface to access two different information layers. The characteristic feature in this case is that the film thickness of the recording film is 10 nm or less. The use of the interface layer of the invention clarifies the characteristic features that it is possible to increase the transmittance and the optical contrast between a crystalline state and amorphous state.

The inventors conducted experiments by using materials such as germanium nitride (GeN), silicon carbide (Si—C), silicon nitride (Si—N), and Ta$_2$O$_5$+SiC already known as interface film materials having the effect of promoting crystallization of a recording film. Consequently, the inventors have found the tradeoff by which the carrier-to-noise ratio (CNR) decreases when a material having a large crystallization promoting effect is used, and a material having a high CNR is inferior in crystallization promoting effect. Also, these materials except for Si—N have relatively large absorption, i.e., have large optical extinction coefficients for a blue-violet LD used for the next-generation DVD, i.e., at wavelength λ=405 nm, thereby producing an optical loss. This optical loss cannot be decreased without increasing the power of a laser to be emitted. Also, this makes it difficult to increase the transmittance of L0, and decreases both the sensitivity and contrast of L1. As a consequence, many problems arise for a dual-layer medium.

Fortunately, however, when zirconium (Zr), oxygen (O), nitrogen (N), and one or both of yttrium (Y) and niobium (Nb) are used, the degree of the tradeoff is particularly small, and it is possible to achieve both a high CNR and a large crystallization promoting effect, and, in the case of a dual-layer medium, both a high transmittance and a high contrast. In addition, the interface film material of the invention makes it possible to control the behavior of crystallization promotion, i.e., control the crystallization rate and refractive index at the same time by adjusting the composition of each element within the above range.

10th Embodiment

REDML Structure or TRC Structure

Figure 2:
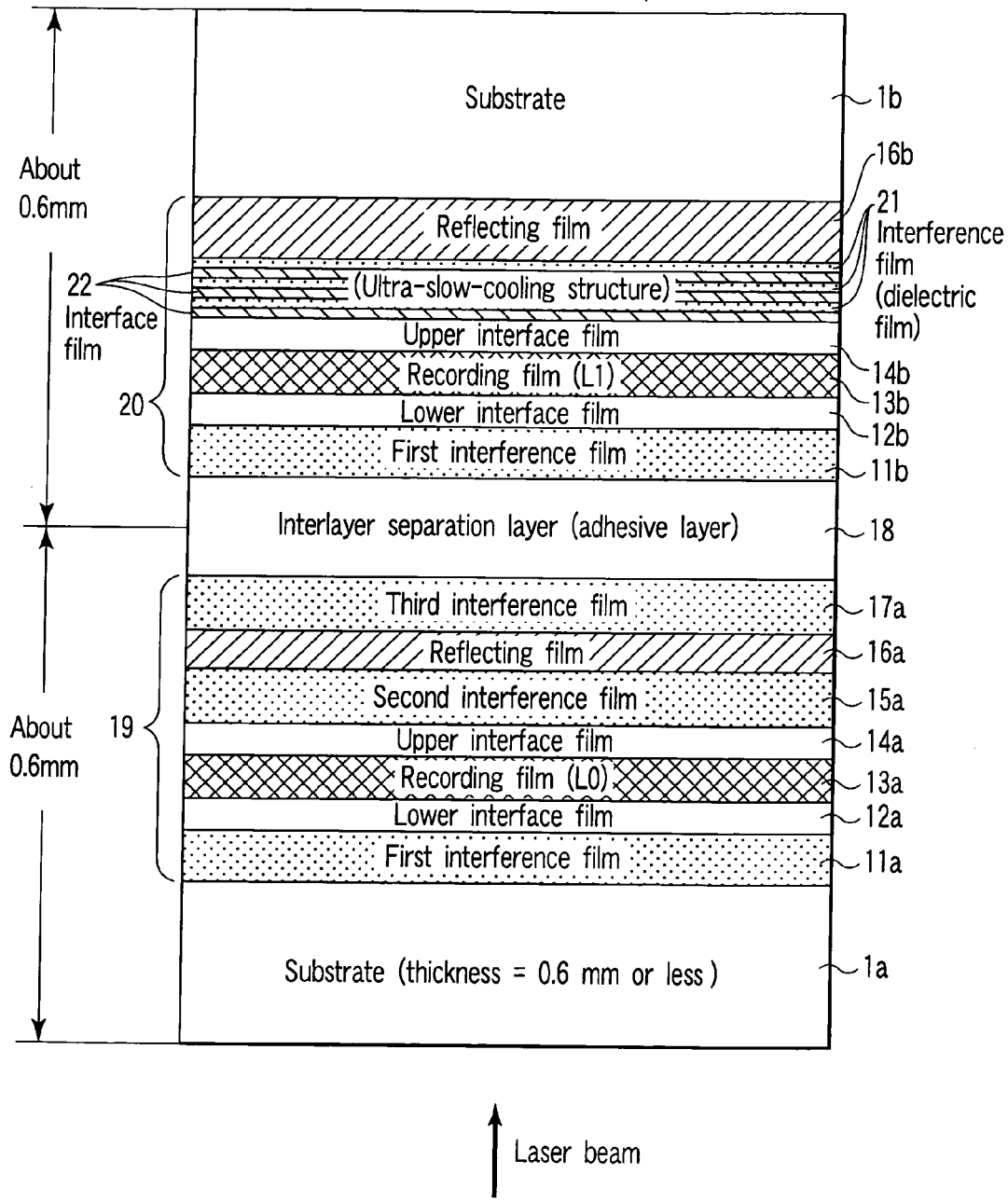
FIG. 2 is an exemplary view for explaining the sectional structure of an optical recording medium (Example 2) according to another embodiment of the invention.

FIG. 2 is a view for explaining the sectional structure of an optical recording medium (Example 2) according to another embodiment of the invention. In Example 2 shown in FIG. 2, second interference film 15b in Example 1 shown in FIG. 1 has an ultra-slow-cooling structure (21+22). As substrates 1a and 1b of this example shown in FIG. 2, 0.59-mm thick polycarbonate (PC) substrates formed by injection molding are used. Since grooves are formed at a groove pitch of 0.68 μm, the track pitch is 0.34 λm when data is recorded on both lands (L) and grooves (G). In information layer L0 19 formed by using a sputtering apparatus (to be described later with reference to FIG. 20) close to the light incident side on the surface of PC substrate 1a in which the grooves are formed, ZnS:SiO$_2$ 11a, interface layer 12a, recording film layer 13a, interface layer 14a, ZnS:SiO$_2$ 15a, Ag alloy 16a, and ZnS:SiO$_2$ 17a are sequentially formed.

In information layer L1 20 formed far from the light incident side, Ag alloy 16b, three-layer stacked film (21+22) having an REDML structure, interface layer 14b, recording film layer 13b, interface layer 12b, and ZnS:SiO$_2$ 11b are sequentially stacked in this order from PC substrate 1b. In a three-layer stacked film (21+22) having the REDML structure, ZnS:SiO$_2$ interface layer material 22 and ZnS:SiO$_2$ interference film (dielectric film) 21 are alternately stacked (in this example, three layers are alternately stacked). A GeSbTeBi-based recording film is used as recording film layer 13b. The film thickness of the recording film is 10 nm or less.

Interface layers 12b and 14b had a composition containing Zr (zirconium), O (oxygen), N (nitrogen), and one or both of Y (yttrium) and Nb (niobium), and having a composition ratio represented by $(ZrO_{2-x}N_x)_{1-y}((Y_2O_3)_{1-z}(Nb_2O_5)_z)_y$, wherein (x, y, z)=(0.05, 0.05, 0). The ZnS:SiO$_2$ film is formed by using a target obtained by mixing SiO$_2$ in ZnS. The sputtering apparatus used is a so-called Cluster type with multi chamber sputtering apparatus which sputters individual layers in different film formation chambers.

The bit error rate (SbER) is $2.3 \times 10^{-5}$ or less for both the lands and grooves, i.e., a practical error rate is obtained. Then, analog data comparison is performed. In this medium, the CNR is 52.8 dB or more for both the lands and grooves, and above all the sensitivity of L1 is as high as 4.4 mW, indicating excellent results. When the CNR power characteristic is evaluated, it is found that the formation of amorphous marks to the recording film started from a very low power. The sensitivity can be further raised by increasing the total number of layers in the REDML structure (having three layers in FIG. 2) to, e.g., four or five.

When a thin film which comprised a multi-layer film (21+22) having three or more layers equal in refractive index and different in material and in which at least one layer is made of Zr, O, N, and one or both of Y and Nb is formed between recording film 13 or interface layer thin film 14 in contact with recording film 13 and metal reflecting film 16, in order to perform optical adjustment and adjustment of the heating and cooling degrees at the same time, it is possible to freely change the effective heat conduction characteristic while a good crystallization promoting function is maintained and the practical refractive indices of the layers of the multi-layer film are held equal.

The inventors call this structure (e.g., 21+22 shown in FIG. 2) an REDML (Response Enhanced Dielectric Multi Layer) structure, or a TRC (Thermal Response Controlled Dielectric Multi Layer) structure. This is so because the boundary thermal resistance appears in the interface between thin films when different types of thin-film materials are stacked. When ZnS—SiO$_2$, for example, is used as the other thin-film material to be stacked, it is possible to implement an ultra-slow-cooling structure (a structure in which the heat of the recording film does not easily escape to the reflecting film side due to the boundary thermal resistance described above) which is conventionally unachievable, since the thermo-physical property values depend only upon the materials if the external environment remains the same.

An optical recording medium generates heat by light absorbed by a recording film, and cools when the heat is conducted via the upper and lower films. Generally, heat generation by light received by the recording film is determined by the balance between the heat conduction characteristics of the films above and below the recording film and the crystallization rate of the recording film, in addition to the power, linear velocity, and irradiation time. Whether the recording film becomes amorphous or crystalline is determined by the degree of heat generation determined as above. Accordingly, it is impossible to form good recording marks and obtain satisfactory erase characteristics at a given linear velocity without controlling the thermal conductivities of the films above and below the recording film.

The interface layer material of the invention can simultaneously control the behavior of crystallization promotion, i.e., the crystallization rate and the refractive index by adjusting the compositions of the individual elements. It is also possible to change the heat conduction characteristics (by appropriately using the ultra-slow-cooling structure described above). This makes design of the recording medium film arrangement very easy, and also makes it possible to replace the ZnS:SiO$_2$ protective film, which is conventionally regarded as indispensable, with the interface film material. In this case, the number of stacked layers of the film can be reduced, so a readily manufacturable recording medium can be provided.

In the following explanation, embodiments of single-sided, dual-layer media will be described. Also, as measurement data of an optical disc manufactured by way of trial, the lowest value of lands (L) and grooves (G) of L0 and L1 in each experiment is indicated as a typical value. The transmittance, reflectance, and the like of an optical recording medium manufactured by way of experiment are measured using a spectrophotometer. Also, the concentration of each element in a thin film is measured using an analytical method such as ICP (Induced Coupled Plasma), RBS (Rutherford Backscattering Spectrometry), SIMS (Secondary Ion Mass Spectroscopy), TOF-SIMS, or XPS (X-ray Photoelectron Spectroscopy). The form of bonding between individual elements in a film is found by, e.g., XPS or IR (Infrared Spectroscopy). The thermal conductivity and thermal diffusivity of a thin film and the boundary thermal resistance between stacked thin films are evaluated by the thermoreflectance method.

Figure 3:
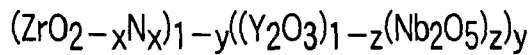
FIG. 3 is an exemplary view showing an extinction coefficient when the composition (x, y, z) of a compound $(ZrO_{2-x}N_x)_{1-y}((Y_2O_3)_{1-z}(Nb_2O_5)_z)_y$ used in an interface layer of an optical recording medium according to an embodiment of the invention is changed.

FIG. 3 is a view showing the extinction coefficient of a compound $(ZrO_{2-x}N_x)_{1-y}((Y_2O_3)_{1-z}(Nb_2O_5)_z)_y$ used in an interface layer of an optical recording medium according to an embodiment of the invention when the composition (x, y, z) of the compound is changed.

First Embodiment

Prior to a description of an embodiment of an optical recording medium manufactured by way of trial, the extinction coefficient of a thin film made of Zr (zirconium), O (oxygen), N (nitrogen), and one or both of Y (yttrium) and Nb (niobium) according to this embodiment will be explained in detail below. Several samples are manufactured by changing the composition ratio of the composition represented by $(ZrO_{2-x}N_x)_{1-y}((Y_2O_3)_{1-z}(Nb_2O_5)_z)_y$ of a thin film made of Zr, O, N, and one or both of Y and Nb of this embodiment within the ranges of $0<x\leq0.5$, $0<y\leq0.1$, and $0\leq z\leq1$, and characteristics near a wavelength of 250 to 1,000 nm are evaluated by using spectroscopic ellipsometry. The composition of each sample is indicated by the combination (x, y, z).

More specifically, samples having compositions shown in FIG. 3 are manufactured and evaluated. FIG. 3 shows data obtained near a wavelength of 405 nm as the wavelength used by this optical recording medium. As indicated by the evaluation results shown in FIG. 3, the extinction coefficient of each sample obtained by changing the composition ratio of the composition represented by $(ZrO_{2-x}N_x)_{1-y}((Y_2O_3)_{1-z}(Nb_2O_5)_z)_y$ of a thin film made of Zr (zirconium), O (oxygen), N (nitrogen), and one or both of Y (yttrium) and Nb (niobium) of this embodiment within the ranges of $0<x\leq0.5$, $0<y\leq0.1$, and $0\leq z\leq1$ is $1\times10^{-2}$ or less, so the film is suitably used in the next-generation, high-density optical recording medium.

Also, the extinction coefficient of each sample obtained by changing the composition ratio within the ranges of $0x\leq0.2$, $0<y\leq0.1$, and $0\leq z\leq1$ is $1\times10^{-3}$ or less, so the film is more suitably used in the next-generation, high-density optical recording medium. Note that the extinction coefficient of the thin film of the invention somewhat depends on the addition amount of Y or N as well, and increases substantially in proportion to the amount of nitrogen in the film when this point is taken into consideration. Although not shown in FIG. 3, a similar tendency is obtained even when Hf or Ti in the same group as Zr or Ge, Si, or Ta as a suitable additional element is added.

Note that FIG. 3 shows only data near a wavelength of 405 nm, though similar tendencies are obtained throughout the range of 250 to 1,000 nm as the measurement wavelength. Accordingly, even when a laser having a wavelength shorter than 400 nm, e.g., 351 or 266 nm is to be used, the interface layer material according to the embodiment of the invention is transparent and can be used as a good dielectric material having no optical loss.

Second Embodiment

Examination of Composition of Interface Layer and Composition of Recording Film Series This embodiment gives a supplementary explanation to the optical recording medium shown in FIG. 1. As substrates, 0.59-mm thick polycarbonate (PC) substrates formed by injection molding are used. Since grooves are formed at a groove pitch of 0.68 μm, the track pitch is 0.34 μm when data is recorded on both lands (L) and grooves (G). In information layer L0 formed by using a sputtering apparatus close to the light incident side on the surface of PC substrate 1a in which the grooves are formed, ZnS:SiO$_2$ (a first interference film), an interface layer (lower interface film), a recording film layer, an interface layer (upper interface film), ZnS:SiO$_2$ (a second interface film), an Ag alloy (a reflecting film having transmittance to a laser beam), and ZnS:SiO$_2$ (a third interference film) are sequentially formed. In information layer L1 formed far from the light incident side, an Ag alloy (a reflecting film having no transmittance to a laser beam), ZnS:SiO$_2$ (a second interference film), an interface layer (upper interface film), a recording film layer, an interface layer (lower interface film), and ZnS:SiO$_2$ (a first interference film) are sequentially stacked in this order from PC substrate 1b. The sputtering apparatus used in the film formation is a so-called Cluster type with multi chamber sputtering apparatus which sputters individual layers in different film formation chambers. This Cluster type with multi chamber sputtering apparatus comprises a load-lock chamber for loading/unloading a substrate, a transfer chamber, and a process chamber for forming each film.

The arrangement of the process chamber will be briefly described below. The process chamber includes a device for evacuating the chamber, a vacuum indicator, a pressure sensor, a film thickness meter, a sputtering target as a material for film formation, and a loaded substrate. An inert gas such as Ar is mainly used as a sputtering gas, and oxygen or nitrogen gas is also used as needed. As the form of discharge during sputtering, a radio-frequency (RF) power supply, direct-current (DC) power supply, or the like is used in accordance with, e.g., the material for film formation or the intended film quality.

The recording film layers (13a and 13b) according to the embodiment of the invention are selected from:

a recording film layer made of Ge, Sb, and Te and having a composition surrounded by x=55·z=45, x=45·z=55, x=10·y=28·z=42, and x=10·y=36·z=54 on a GeSbTe ternary phase diagram, when the composition is represented by Ge$_x$Sb$_y$Te$_z$ wherein x+y+z=100, a recording film layer made of Ge, Sb, Te, and Bi or Sn and having a composition represented by GeSbTeBi, GeSbTeSn, or GeSbTeBiSn which satisfied 0≦w<0.5 and 0≦v<0.7, when a composition obtained by partially substituting the above-mentioned composition GeSbTe with Bi and/or Sn is represented by (Ge$_w$ Sn$_{(1-w)}$)$_x$(Sb$_v$ Bi$_{(1-v)}$)$_y$Te$_z$ wherein x+y+z=100 and, a recording film layer made of Ge, Bi, and Te and having a composition surrounded by x=55·z=45, x=45·z=55, x=10·y=28·z=42, and x=10·y=36·z=54 on a GeBiTe ternary phase diagram, when the composition is represented by Ge$_x$Bi$_y$Te$_z$ wherein x+y+z=100.

Or, the recording film layers (13a and 13b) according to the embodiment of the invention are selected from:

a recording film layer made of Ge, Sb, and Te and having a composition surrounded by x=55·z=45, x=45·z=55, x=10·y=28·z=42, and x=10·y=36·z=54 on a GeSbTe ternary phase diagram, when the composition is represented by Ge$_x$Sb$_y$Te$_z$ wherein x+y+z=100, a recording film layer made of Ge, Sb, Te, and Bi or Sn and having a composition represented by GeSbTeBi, GeSbTeSn, GeSnSbTeIn, GeSbTeIn, GeSbTeBiIn, GeSbSnTeBiIn, GeSnSbTeBiIn or GeSbTeBiSn which satisfied 0≦w<0.5 and 0≦v<0.7 and 0≦u≦1.0, when a composition obtained by partially substituting the above-mentioned composition GeSbTe with Bi and/or Sn and/or In is represented by (Ge$_{(1-w)}$ Sn$_w$)$_x$(Sb$_v$ (Bi$_{(1-u)}$ In$_u$)$_{(1-v)}$)$_y$Te$_z$ wherein x+y+z=100, and a recording film layer made of Ge, Bi, and Te and having a composition surrounded by x=55·z=45, x=45·z=55, x=10·y=28·z=42, and x=10·y=36·z=54 on a GeBiTe ternary phase diagram, when the composition is represented by Ge$_x$Bi$_y$Te$_z$ wherein x+y+z=100.

Many compositions are examined, and FIG. 6 shows examples. In this embodiment, GeSbTeBi-based recording films (which may properly include In) are used. Note that the film thickness of each recording film is 10 nm or less.

The interface layer is made of Zr (zirconium), O (oxygen), N (nitrogen), and one or both of Y (yttrium) and Nb (niobium), and had a composition represented by (ZrO$_{2-x}$N$_x$)$_{1-y}$((Y$_2$O$_3$)$_{1-z}$(Nb$_2$O$_5$)$_z$)$_y$ wherein (x, y, z)=(0.05, 0.05, 0). A chemical formula is (ZrO$_{1.95}$N$_{0.05}$)$_{99.5}$(Y$_2$O$_3$)$_{0.05}$.

The ZnS:SiO$_2$ film (interference film) is formed by using a target obtained by mixing SiO$_2$ in ZnS. The sputtering apparatus used is a so-called Cluster type with multi chamber sputtering apparatus which sputters individual layers in different film formation chambers. After each medium is formed, the reflectance and transmittance are measured using a spectrophotometer.

After that, the recording film on the entire medium surface of each layer is crystallized by using an initializing apparatus (not shown). After the initialization, the layers are adhered by a UV resin (an ultraviolet-curing resin having a refractive index equivalent to that of polycarbonate) such that the surfaces on which the films are formed faced each other, thereby forming an interlayer separation layer. The thickness of this interlayer separation layer is 20 nm. Evaluation is performed by using the ODU-1000 disc evaluation apparatus manufactured by Pulstec. This apparatus is equipped with a blue-violet semiconductor laser having a wavelength of 405 nm, and an objective lens having NA=0.65. Recording experiments are conducted by the method of land-groove recording. FIG. 7 shows the conditions.

The experiments for evaluating the disc characteristics are roughly classified into the following four experiments.

(1) Measurement of Bit Error Rate (SbER)

One is measurement of the bit error rate (SbER: Simulated bit Error Rate) by which the data error rate is measured. The other is analog measurement for determining the readout signal quality. In the SbER measurement, a mark string including patterns from 2 T to 13 T at random is overwritten 10 times. Then, the random patterns are overwritten 10 times on adjacent tracks on the two sides of the former track. After that, the SbER of the middle track is measured.

(2) Analog Measurement

The analog measurement is done as follows. First, a mark string including patterns from 2 T to 13 T at random is overwritten 10 times. Then, a 9 T single pattern is overwritten once on this mark string, and the carrier-to-noise ratio (CNR) of the signal frequency of the 9 T mark is measured by a spectrum analyzer. After that, a laser beam having an erase power level is emitted for one rotation of the disc to erase the recorded marks. In this state, the reduction in carrier intensity of the 9 T mark is measured and defined as the erase ratio (ER). The optical head is then moved to a well separated track to measure the cross erase (E-X).

(3) Overwrite (OW) Test

As the third measurement, an experiment is conducted on the overwrite (OW) characteristic. In this experiment, the CNR is measured while a random signal is overwritten (OW) on the same track, thereby checking whether the count of overwrite is 2,000 or more when the CNR reduced by 2 dB or more from the initial value. This experiment is not conducted to check the limit count of OW. For video recording, the limit count of OW is about 1,000. For data recording of a personal computer (PC), the limit count of OW is 10,000 or more. Since, however, the market for video recording is much larger than that for data recording, the evaluation is performed in view of video recording.

(4) Environmental Test

In the environmental test, the manufactured disc is exposed to 80° C. and 80% RH for 100 hrs, and whether the layers forming the multi-layer film in the optical recording medium peeled from each other is observed with a microscope. If no peeling occurs, this indicates that the adhesion is good, and the disc will show stable characteristics for a long time period even if exposed to various environments.

Note that the optimum power of the SbER measurement described above is defined as the sensitivity of the medium. To measure the sensitivity and transmittance of L0, a medium obtained by adhering L0 having the arrangement of this embodiment and a blank disc having no films on it, and a medium obtained by adhering L1 and a blank disc having no films on it are additionally prepared. Each evaluation is performed at a constant velocity, i.e., a linear velocity of 5.4 m/sec unless otherwise specified.

The above-mentioned conditions are used in common in all the following embodiments. Note that in the evaluation conditions shown in FIG. 7, the double velocity is 10.8 m/sec, and the fourfold velocity is 21.6 m/sec.

Third Embodiment

Discs having the same arrangement as that of the second embodiment are formed by using, as interface layers, compositions which are made of Zr (zirconium), O (oxygen), N (nitrogen), and one or both of Y (yttrium) and Nb (niobium) (represented by $((ZrO_{2-x}N_x)_{1-y}((Y_2O_3)_{1-z}(Nb_2O_5)_z)_y$, and had composition ratios shown in FIG. 4, and the same experiments as in the second embodiment are conducted. FIG. 9 shows the results. As shown in FIG. 9, the SbER of each sample is on the order of $10^{-5}$ for both lands and grooves, i.e., a practical error rate is obtained by each sample. The CNR for analog data is also as high as 52 dB or more for both lands and grooves. The OW count of each medium is 2,000 or more, i.e., a practical characteristic is obtained. In addition, no peeling is found in the film after the environmental test.

The criteria of total evaluation in the third embodiment shown in FIG. 9 are that the CNR is 52 dB or more, the SbER is $2 \times 10^{-5}$ or less, the write power of L1 is 5.5 mW or less, the transmittance T of L0 is 51% or more, and the erase ratio is −33 dB or less. If three or more of these conditions are met, the evaluation is Very Good. If two or less of these conditions are met, the evaluation is Good.

Fourth Embodiment

As substrates, 0.59-mm thick polycarbonate (PC) substrates formed by injection molding are used. Since grooves are formed at a groove pitch of 0.68 μm, the track pitch is 0.34 μm when data is recorded on both lands (L) and grooves (G). In information layer L0 formed by using a sputtering apparatus close to the light incident side on the surface of this PC substrate in which the grooves are formed, ZnS:SiO$_2$, an interface layer, a recording film layer, an interface layer, an Ag alloy, and an interface layer material are sequentially formed. In information layer L1 formed far from the light incident side, an Ag alloy, an interface layer, a recording film layer, an interface layer, and ZnS:SiO$_2$ are sequentially stacked in this order from the PC substrate.

The same material as in the second embodiment is used as the recording film, and the film thickness of the recording film is 10 nm or less. A disc is formed by using, as an interface layer, a composition made of Zr (zirconium), O (oxygen), N (nitrogen), and one or both of Y (yttrium) and Nb (niobium), and represented by $((ZrO_{2-x}N_x)_{1-y}((Y_2O_3)_{1-z}(Nb_2O_5)_z)_y$, wherein (x, y, z)=(0.05, 0.05, 0). Alternatively, a composition made of Zr (zirconium), O (oxygen), N (nitrogen), and one or both of Y (yttrium) and Nb (niobium), and represented by $((ZrO_{2-x}N_x)_{1-y}((Y_2O_3)_{1-z}(Nb_2O_5)_z)_y$, wherein (x, y, z)=(0.5, 0.05, 0) is used as an interface layer material. The experiments are conducted following the same procedures as in the second embodiment.

FIG. 8 shows the results of total evaluation under the conditions described above. The SbER is $1.5 \times 10^{-5}$ or less for both lands and grooves, i.e., a practical error rate is obtained. Then, analog data comparison is performed. The CNR of this medium is as high as 52 dB for both lands and grooves, indicating good results. The OW count is also 2,000 or more, i.e., a practical characteristic is obtained. In addition, no peeling is found in the film after the environmental test.

Note that the criteria of the total evaluation shown in FIG. 8 are that the CNR is 52 dB or more, the SbER is $2 \times 10^{-5}$ or less, the write power of L1 is 5.5 mW or less, the transmittance T of L0 is 51% or more, and the erase ratio is −33 dB or less. If three or more of these conditions are met, the evaluation is Very Good. If two or less of these conditions are met, the evaluation is Good.

FIG. 8 shows the evaluation results except for the OW count and the result of the environmental test. The SbER is $1.9 \times 10^{-5}$ or less for both lands and grooves. The OW count is also 2,000 or more, i.e., a practical characteristic is obtained. In addition, no peeling is found in the film after the environmental test. For reference, the OW characteristic is evaluated by repeating OW 10,000 times or more only in this embodiment. As a consequence, it is possible to perform OW about 10,000 times. Then, analog data comparison is performed. In this medium, the CNR is 52.9 dB or more for both lands and grooves, the erase ratio is −33.8 dB or less, and the cross erase is −0.1 dB or less, indicating good results. Also, the sensitivity of L1 and the transmittance of L0 which are particularly problems in a dual-layer medium are respectively 5.5 mW or less and 51.4%, i.e., both the values are good. The sensitivity of L1 is 10.9 mW in an actual single-sided, dual-layer disc obtained by adhering L0 and L1. Since light is reduced by about half by L0 in an actual single-sided, dual-layer disc as described above, the target LD power for L1 is almost doubled. Therefore, the sensitivity of L1 is increased in addition to increasing the transmittance of L0. In a medium which performs high-speed recording, the time during which the medium is irradiated with a laser is short. This inevitably raises the target LD power. Accordingly, the sensitivity of not only L1 but also L0 is increased.

The film arrangement of this embodiment is formed on a 1.1-mm thick polycarbonate (PC) substrate formed by injection molding, and a 75-μm thick transparent cover layer is formed on the substrate to form a disc. The recording/erase characteristics of the medium are evaluated by using an evaluation apparatus including a blue-violet semiconductor laser having a wavelength of 405 nm and an objective lens having NA=0.85. The groove pitch of the substrate is 0.32 μm, and the evaluation is performed by groove recording. The CNR is 52 dB or more, the erase ratio is −30 dB or less, and the OW count is 2,000 or more, i.e., very good results are obtained. Accordingly, the interface layer material according to the embodiment of the invention is presumably favorable regardless of the thickness of the substrate, and the thickness of the cover layer on the light incident side.

Note that although good results are obtained when the recording film layer is made of a GeSbTe-based material or GeSbTeSn-based material, better characteristics are obtained when a GeSbTeBi-based material or GeBiTe-based material is used.

It is estimated by the results of analyses such as RBS, XPS, and SIMS that N is placed by substituting the site of O in the thin film used as the interface layer which is made of Zr (zirconium), O (oxygen), N (nitrogen), and one or both of Y (yttrium) and Nb (niobium). This tendency is also found in an embodiment (in which a sixth element is added to an interface layer) to be described later.

Fifth Embodiment

As substrates, 0.59-mm thick polycarbonate (PC) substrates formed by injection molding as in the second embodiment and the like are used. Since grooves are formed at a groove pitch of 0.68 μm, the track pitch is 0.34 μm when data is recorded on both lands (L) and grooves (G). In information layer L0 formed by using a sputtering apparatus close to the light incident side on the surface of this PC substrate in which the grooves are formed, ZnS:SiO$_2$, an interface layer, a recording film layer, an interface layer, an Ag alloy, and an interface layer material are sequentially formed. In information layer L1 formed far from the light incident side, an Ag alloy, an interface layer, ZnS:SiO$_2$, an interface layer, a recording film layer, an interface layer, and ZnS:SiO$_2$ are sequentially stacked in this order from the PC substrate.

The same material as in the second embodiment is used as the recording film, and the film thickness of the recording film is 10 nm or less. A disc is formed by using, as an interface layer, a composition made of Zr (zirconium), O (oxygen), N (nitrogen), and one or both of Y (yttrium) and Nb (niobium), and represented by $((Zro_{2-x}N_x)_{1-y}((Y_2O_3)_{1-z}(Nb_2O_5)_z)_y$ wherein (x, y, z)=(0.05, 0.05, 0). Alternatively, a composition made of Zr (zirconium), O (oxygen), N (nitrogen), and one or both of Y (yttrium) and Nb (niobium), and represented by $((Zro_{2-x}N_x)_{1-y}((Y_2O_3)_{1-z}(Nb_2O_5)_z)_y$ wherein (x, y, z)=(0.5, 0.05, 0) is used as an interface layer material. The same experiments as in the second embodiment are conducted. FIG. 8 shows the results. The SbER is $1.6 \times 10^{-5}$ or less for both lands and grooves, i.e., a practical error rate is obtained. Then, analog data comparison is performed. The CNR of this medium is as high as 52 dB for both lands and grooves. The OW count is also 2,000 or more, i.e., a practical characteristic is obtained. In addition, no peeling is found in the film after the environmental test.

Sixth Embodiment

Addition of Sixth Element to Interface Layer

Discs having the same arrangement as that of the second embodiment are formed by using, as interface layers, thin films obtained by adding at least one element selected from Hf (hafnium), Ti (titanium), Ta (tantalum), Ge (germanium), Si (silicon), Ce (cerium), and Mg (magnesium) to materials which are made of Zr (zirconium), O (oxygen), N (nitrogen), and one or both of Y (yttrium) and Nb (niobium), represented by $((Zro_{2-x}N_x)_{1-y}((Y_2O_3)_{1-z}(Nb_2O_5)_z)_y$, and selected from the ranges of $0<x \leq 0.5$, $0<y \leq 0.1$, and $0 \leq z \leq 1$.

The arrangements of the interface layer materials are as shown in FIG. 5. The same experiments as in the second embodiment are conducted. FIG. 8 shows the results. As shown in FIG. 8, the SbER of each sample is on the order of $10^{-5}$ for both lands and grooves, i.e., a practical error rate is obtained by each sample. For analog data, the CNR of each sample is as high as 52 dB or more for both lands and grooves. Likewise, the OW count of each medium is 2,000 or more, i.e., a practical characteristic is obtained. In addition, no peeling is found in the film after the environmental test. Note that the sixth elements used in practicing the invention are found to have the effects of, e.g., making the optical constant of the interface layer material variable, and further increasing the stability.

Seventh Embodiment

Selection of Range of Best Interface Layer Composition

Of the discs used in the second to sixth embodiments, the samples using the GeSbTe-based recording films are evaluated at different linear velocities. Each sample is evaluated in the same manner as in the second embodiment. FIG. 10 shows comparison of the values of erase ratio. The criteria of total evaluation shown in FIG. 10 are that the CNR is 52 dB or more, the SbER is $2 \times 10^{-5}$ or less, the write power of L1 is 5.5 mW or less, the transmittance T of L0 is 51% or more, and the erase ratio is −33 dB or less. If three or more of these conditions are met, the evaluation is Very Good. If two or less of these conditions are met, the evaluation is Good.

As is evident from these evaluations, when the composition is represented by $(Zro_{2-x}N_x)_{1-y}((Y_2O_3)_{1-z}(Nb_2O_5)_z)_y$, and the composition ratio fell within the ranges of $0<x \leq 0.5$, $0<y \leq 0.1$, and $0 \leq z \leq 1$, particularly the erase ratio is kept very high even if recording and erase are performed at a high linear velocity, so more suitable results are obtained. Also, the OW count is 2,000 or more, i.e., a practical characteristic is obtained. In addition, no peeling is found in the film after the environmental test.

Eighth Embodiment

Selection of Range of Best Recording Film Composition

Discs having the same arrangement as that of the second embodiment are formed by using, as an interface layer, a composition which is made of Zr (zirconium), O (oxygen), N (nitrogen), and one or both of Y (yttrium) and Nb (niobium) (represented by $(Zro_{2-x}N_x)_{1-y}((Y_2O_3)_{1-z}(Nb_2O_5)_z)_y$, and had a composition ratio of (x, y, z)=(0.15, y, z).

Recording film layers used are selected from a recording film layer made of Ge, Sb, and Te and having a composition surrounded by x=55·z=45, x=45·z=55, x=10·y=28·z=42, and x=10·y=36·z=54 on a GeSbTe ternary phase diagram, when the composition is represented by Ge$_x$Sb$_y$Te$_z$ wherein x+y+z=100; a recording film layer made of Ge, Sb, Te, and Bi or Sn and having a composition represented by GeSbTeBi, GeSbTeSn, or GeSbTeBiSn which satisfied $0 \leq w<0.5$ and $0 \leq v<0.7$, when a composition obtained by partially substituting the above-mentioned composition GeSbTe with Bi and/or Sn is represented by $(Ge_w Sn_{(1-w)})_x(Sb_v Bi_{(1-v)})_y Te_z$ wherein x+y+z=100; and a recording film layer made of Ge, Bi, and Te and having a composition surrounded by x=55·z=45, x=45·z=55, x=10·y=28·z=42, and x=10·y=36·z=54 on a GeBiTe ternary phase diagram, when the composition is represented by Ge$_x$Bi$_y$Te$_z$ wherein x+y+z=100.

Or, recording film layers used are selected from a recording film layer made of Ge, Sb, and Te and having a composition surrounded by x=55·z=45, x=45·z=55, x=10·y=28·z=42, and x=10·y=36·z=54 on a GeSbTe ternary phase diagram, when the composition is represented by Ge$_x$Sb$_y$Te$_z$ wherein x+y+z=100; a recording film layer made of Ge, Sb, Te, and Bi or Sn or In and having a composition represented by GeSbTeBi, GeSbTeSn, GeSnSbTeIn, GeSbTeIn, GeSbTeBiIn, GeSbSn- TeBiIn, GeSnSbTeBiIn or GeSbTeBiSn which satisfied $0\leq w<0.5$ and $0\leq v<0.7$ and $0\leq u<1.0$, when a composition obtained by partially substituting the above-mentioned composition GeSbTe with Bi and/or Sn and/or In is represented by $(Ge_{(1-w)} Sn_w)_x(Sb_v (Bi_{(1-u)} In_u)_{(1-v)})_y Te_z$ wherein $x+y+z=100$; and a recording film layer made of Ge, Bi, and Te and having a composition surrounded by $x=55\cdot z=45$, $x=45\cdot z=55$, $x=10\cdot y=28\cdot z=42$, and $x=10\cdot y=36\cdot z=54$ on a GeBiTe ternary phase diagram, when the composition is represented by $Ge_x Bi_y Te_z$ wherein $x+y+z=100$.

Although many compositions are examined, this embodiment presents discs using GeSbTe-based, GeSbTeSn-based, and GeBiTe-based recording film layers represented by those shown in FIG. 6. The same experiments as in the second embodiment are conducted on these discs. FIG. 11 shows the results. As shown in FIG. 11, both the CNR and SbER of each disc showed good results. The OW count is also 2,000 or more, i.e., a practical characteristic is obtained. In addition, no peeling is found in the film after the environmental test. Note that the criteria of total evaluation of high-speed recording/erase characteristics shown in FIG. 11 are that the evaluation is Very Good if the erase ratio is −33 dB or less at a constant velocity and −32 dB or less at a fourfold velocity, and the evaluation is Good if the erase ratio is −33 dB or more at a constant velocity and −32 dB or more at a fourfold velocity.

Ninth Embodiment

Selection of Range of Best Recording Film Composition: Addition of $N_2$

Discs having the same arrangement as that of the second embodiment are formed by using, as an interface layer, a composition which is made of Zr (zirconium), O (oxygen), N (nitrogen), and one or both of Y (yttrium) and Nb (niobium) (represented by $(Zro_{2-x}N_x)_{1-y}((Y_2O_3)_{1-z}(Nb_2O_5)_z)_y)$, and had a composition ratio represented by $(x, y, z)=(0.15, y, z)$.

Recording film layers used are selected from:

a recording film layer made of Ge, Sb, Te, and N (nitrogen) and obtained by adding 1 to 5 at. % of N (nitrogen) to a GeSbTe-based compound in a composition region surrounded by $x=55\cdot z=45$, $x=45\cdot z=55$, $x=10\cdot y=28\cdot z=42$, and $x=10\cdot y=36\cdot z=54$ on a GeSbTe ternary phase diagram, when the composition of a compound containing Ge, Sb, and Te is represented by $Ge_x Sb_y Te_z$ wherein $x+y+z=100$;

a recording film layer made of Ge, Sb, Te, Bi or Sn, and N (nitrogen) and obtained by adding 1 to 10 at. % of N (nitrogen) to GeSbTeBi, GeSbTeSn, or GeSbTeBiSn which satisfied $0\leq w<0.5$ and $0\leq v<0.7$, when a composition obtained by partially substituting the above-mentioned composition GeSbTe with Bi and/or Sn is represented by $(Ge_w Sn_{(1-w)})_x(Sb_v Bi_{(1-v)})_y Te_z$ wherein $x+y+z=100$;

a recording film layer made of Ge, Bi, and Te, and N (nitrogen), and having a composition surrounded by $x=55\cdot z=45$, $x=45\cdot z=55$, $x=10\cdot y=28\cdot z=42$, and $x=10\cdot y=36\cdot z=54$ on a GeBiTe ternary phase diagram, when the composition is represented by $Ge_x Bi_y Te_z$ wherein $x+y+z=100$; and a recording film layer made of Ge, Sb, Te, and obtained by adding 0.1 to 10 at. % of N (nitrogen) to a GeSbTe-based compound in a composition region surrounded by $x=55\cdot z=45$, $x=45\cdot z=55$, $x=10\cdot y=28\cdot z=42$, and $x=10\cdot y=36\cdot z=54$ on a GeSbTe ternary phase diagram, when the composition of a compound containing Ge, Sb, and Te is represented by $Ge_x Sb_y Te_z$ wherein $x+y+z=100$.

Or, recording film layers used are selected from:

a recording film layer made of Ge, Sb, Te, and N (nitrogen) and obtained by adding 1 to 5 at. % of N (nitrogen) to a GeSbTe-based compound in a composition region surrounded by $x=55\cdot z=45$, $x=45\cdot z=55$, $x=10\cdot y=28\cdot z=42$, and $x=10\cdot y=36\cdot z=54$ on a GeSbTe ternary phase diagram, when the composition of a compound containing Ge, Sb, and Te is represented by $Ge_x Sb_y Te_z$ wherein $x+y+z=100$;

a recording film layer made of Ge, Sb, Te, Bi or Sn or In, and N (nitrogen) and obtained by adding 1 to 10 at. % of N (nitrogen) to GeSbTeBi, GeSbTeSn, GeSnSbTeIn-, GeSbTeIn-, GeSbTeBiIn-, GeSbSnTeBiIn-, GeSnSbTeBiIn- or GeSbTeBiSn which satisfied $0\leq w<0.5$ and $0\leq v<0.7$ and $0\leq u\leq 1.0$, when a composition obtained by partially substituting the above-mentioned composition GeSbTe with Bi and/or Sn and/or In is represented by $(Ge_{(1-w)} Sn_w)_x (Sb_v (Bi_{(1-u)} In_u)_{(1-v)})_y Te_z$ wherein $x+y+z=100$;

a recording film layer made of Ge, Bi, and Te, and N (nitrogen), and having a composition surrounded by $x=55\cdot z=45$, $x=45\cdot z=55$, $x=10\cdot y=28\cdot z=42$, and $x=10\cdot y=36\cdot z=54$ on a GeBiTe ternary phase diagram, when the composition is represented by $Ge_x Bi_y Te_z$ wherein $x+y+z=100$; and a recording film layer made of Ge, Sb, Te, and obtained by adding 0.1 to 10 at. % of N (nitrogen) to a GeSbTe-based compound in a composition region surrounded by $x=55\cdot z=45$, $x=45\cdot z=55$, $x=10\cdot y=28\cdot z=42$, and $x=10\cdot y=36\cdot z=54$ on a GeSbTe ternary phase diagram, when the composition of a compound containing Ge, Sb, and Te is represented by $Ge_x Sb_y Te_z$ wherein $x+y+z=100$.

Although many compositions are examined, compositions obtained by adding 1 to 5 at. % of N (nitrogen) to the typical examples shown in FIG. 6 are used in this embodiment. That is, this embodiment presents examples of discs using recording film layers formed by adding N (nitrogen) to GeSbTe-based, GeSbTeSn-based, and GeBiTe-based materials. Each disc is evaluated by conducting the same experiments as in the second embodiment at a double linear velocity, i.e., a linear velocity of 10.8 m/sec. FIG. 12 shows the results. As shown in this table, both the CNR and SbER of each disc showed good results. The OW count is also 2,000 or more, i.e., a practical characteristic is obtained. In addition, no peeling is found in the film after the environmental test. The addition amount of N (nitrogen) is preferably 1 to 5 at. %, and more preferably, about 3 at. %. Note that the criterion of total evaluation shown in FIG. 12 is that the evaluation is Very Good if the CNR is 53 dB or more, and Good if the CNR is lower than that.

FIG. 13 summarizes the nitrogen-added recording film compositions used in the embodiments and their evaluation results. The criterion of total evaluation shown in FIG. 13 is that the evaluation is Very Good if the SbER is $3\times 10^{-5}$ or less, and Good if the SbER is larger than that. The evaluation criterion of FIG. 13 differs from that of the embodiment shown in FIG. 12 for the reason explained below. That is, in the embodiment shown in FIG. 13, the experiments are conducted at a double velocity, so amorphous marks readily formed. Since this rose the CNR, the evaluation criterion is changed at a constant velocity.

Comparative Examples 1 to 5

Comparative examples will be explained below. Discs having the same arrangement as that of the second embodiment and using interface layers made of $Cr_2O_3$, SiC, $Ta_2O_5$+SiC, GeN, and GeCrN, and using no interface layer are formed. FIG. 14 shows these discs. The same experiments as in the second embodiment are conducted. The results are shown in FIGS. 15 and 16. As shown in FIGS. 15 and 16, any of the CNR, SbER, erase ratio ER, L1 sensitivity, and L0 transmittance is unsatisfactory. Therefore, the OW characteristic is not evaluated.

Referring to FIGS. 15 and 16, Comparative Examples 3 and 4 could not be used for comparison because they are very inferior in constant-velocity characteristics, particularly, erase characteristics. Accordingly, the total evaluation is NG. When the constant-velocity characteristics of Comparative Examples 5 and 6 are evaluated, the CNR is 50 dB or less. Therefore, no other measurements are performed, and the total evaluation is NG.

FIG. 17 is a GeSbTe ternary phase diagram for explaining a favorable composition range of a recording film of an optical recording medium according to an embodiment of the invention. In this example, recording films 13a and 13b contain at least germanium Ge, antimony Sb, and tellurium Te (and also contain nitrogen N in some cases). When the composition of each recording film is represented by $Ge_xSb_yTe_z$ wherein x+y+z=100, the recording film is so configured as to have a composition [A1] in an area defined by x=55·z=45, x=45·z=55, x=10·y=28·z=42, and x=10·y=36·z=54 on a GeSbTe ternary phase diagram or a composition [B1] above the area.

Figure 18:
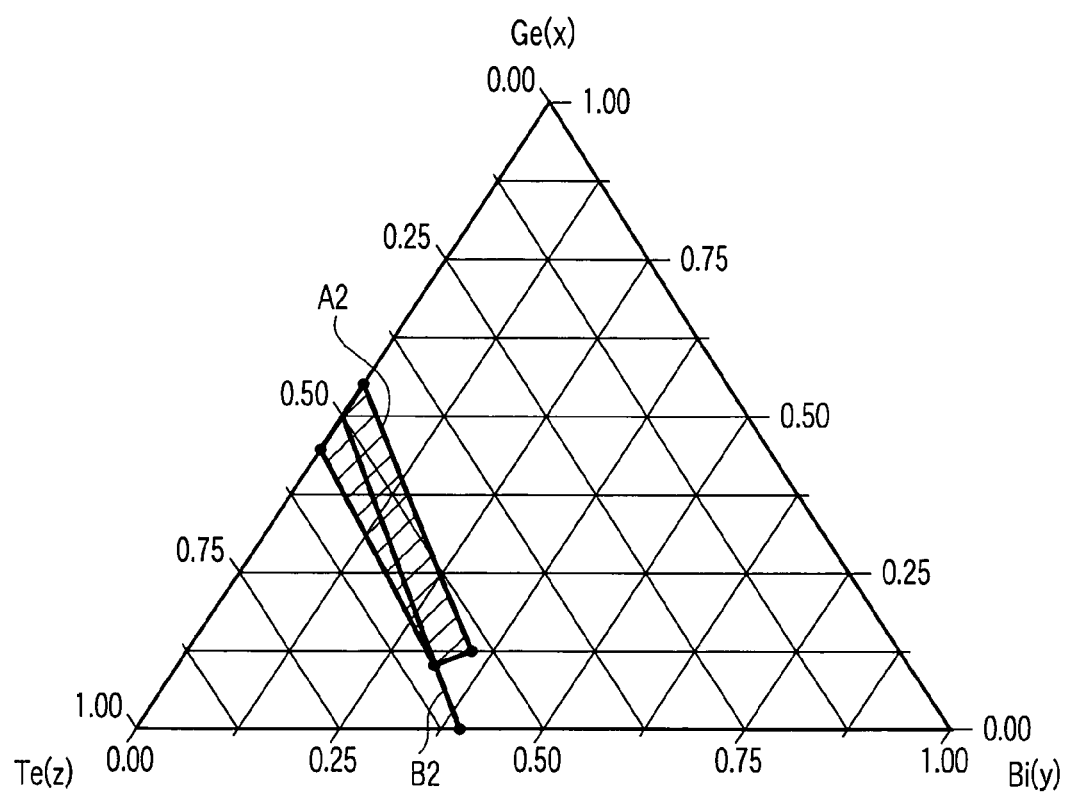
FIG. 18 is an exemplary GeBiTe ternary phase diagram for explaining a favorable composition range of a recording film of an optical recording medium according to an embodiment of the invention.

FIG. 18 is a GeBiTe ternary phase diagram for explaining a favorable composition range of a recording film of an optical recording medium according to an embodiment of the invention. In this example, recording films 13a and 13b contain at least germanium Ge, bismuth Bi, and tellurium Te (and also contain nitrogen N in some cases). When the composition of each recording film is represented by $Ge_xBi_yTe_z$ wherein x+y+z=100, the recording film is so configured as to have a composition [A2] in an area defined by x=55·z=45, x=45·z=55, x=10·y=28·z=42, and x=10·y=36·z=54 on a GeBiTe ternary phase diagram or a composition [B2] above the area.

Figure 19:
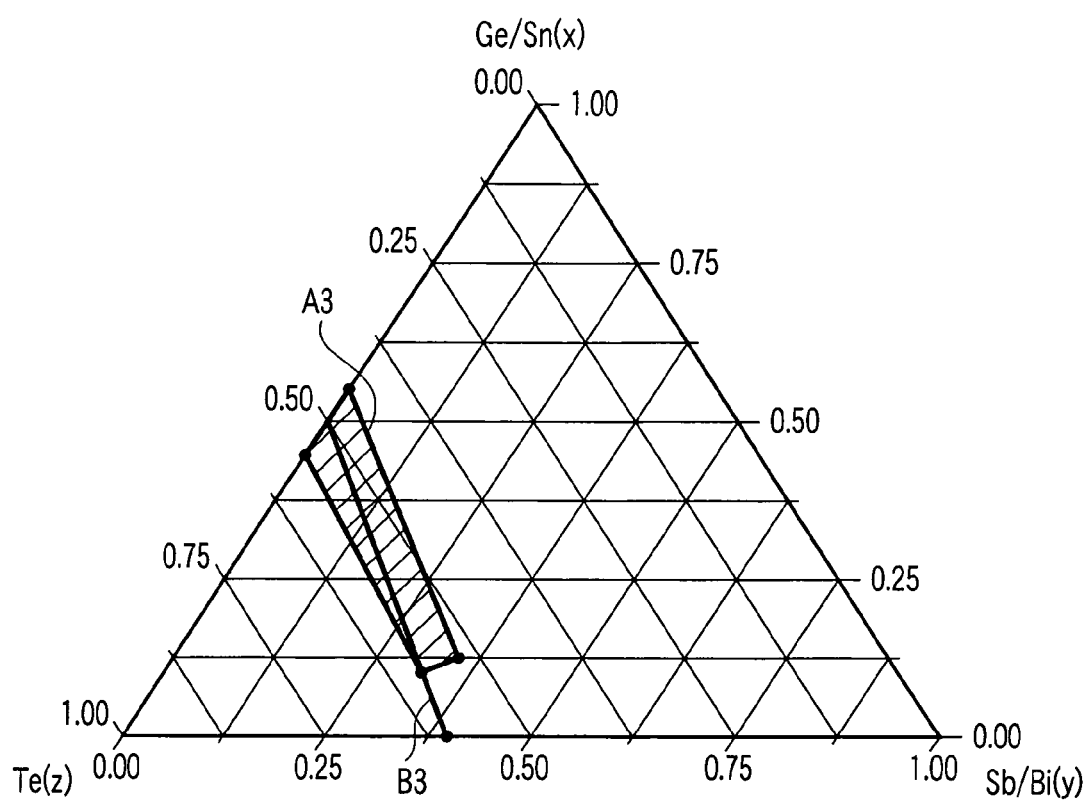
FIG. 19 is an exemplary Ge/Sn—Sb/Bi/In—Te ternary phase diagram for explaining a favorable composition range of a recording film of an optical recording medium according to an embodiment of the invention (when Ge and/or Sb shown in FIG. 17 is substituted by Sn and/or Bi and/or In)

FIG. 19 is a Ge/Sn—Sb/Bi—Te ternary phase diagram for explaining a favorable composition range of a recording film of an optical recording medium according to an embodiment of the invention. This example shows a case in which Ge and/or Sb shown in FIG. 17 is substituted by Sn and/or Bi. In this example, the composition of each of recording films 13a and 13b is substituted by bismuth Bi and/or tin Sn. When the substituted composition is represented by $(Ge_w Sn_{(1-w)})_x(Sb_v Bi_{(1-v)})_y Te_z$ wherein x+y+z=100, w and v in this composition satisfy 0<w<0.5 and 0≦v<0.7. It is also possible to add 1 to 5 at. % of nitrogen N to GeSnSbTe-, GeSbTeBi-, and GeSnSbTeBi-based compounds having this arrangement.

FIG. 19 can be applied to a Ge/Sn—Sb/Bi/In—Te ternary phase diagram showing a favorable composition range of a recording film of an optical recording medium according to another embodiment of the invention. This example shows a case in which Ge and/or Sb and/or In shown in FIG. 17 is substituted by Sn and/or Bi and/or In. In this example, the composition of each of recording films 13a and 13b is substituted by bismuth Bi and/or tin Sn and/or Indium In. When the substituted composition is represented by $(Ge_{(1-w)} Sn_w)_x (Sb_v (Bi_{(1-u)} In_u)_{(1-v)})_y Te_z$ wherein x+y+z=100, w and v in this composition satisfy 0≦w<0.5 and 0≦v<0.7 and 0≦u<1.0. It is also possible to add 1 to 5 at. % of nitrogen N to GeSnSbTe-, GeSbTeBi-, GeSnSbTeIn-, GeSbTeIn-, GeSbTeBiIn-, GeSbSnTeBiIn-, GeSnSbTeBiIn- and GeSnSbTeBi-based compounds having this arrangement.

Figure 20:
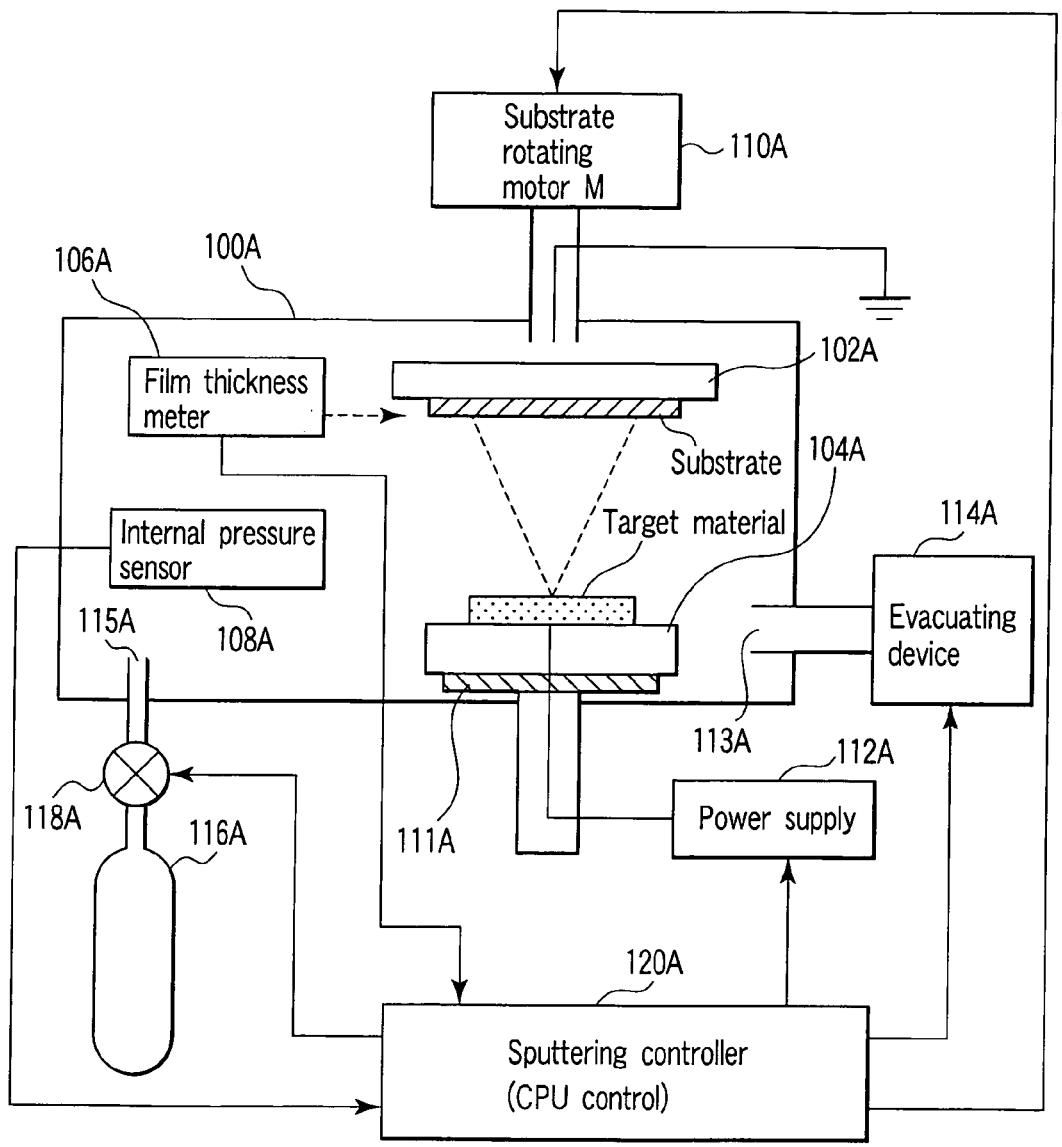
FIG. 20 is an exemplary view for explaining a disc manufacturing apparatus according to an embodiment of the invention.

FIG. 20 is a view for explaining a disc manufacturing apparatus (sputtering apparatus) according to an embodiment of the invention. In the vicinity of the ceiling of vacuum vessel 100A, disc-like rotary base 102A for supporting a PC substrate is disposed so that the rotating surface is horizontal. A PC substrate is supported on the lower surface of rotary base 102A, and rotated by motor 110A (an embodiment in which the substrate is not rotated is also possible).

In the vicinity of the bottom of vacuum vessel 100A, anode plate 104A having a sputtering source (target material) is so disposed as to face rotary base 102A in the upper portion. Rotatable magnet 111A is attached to the lower portion of anode plate 104A. Rotary base (cathode plate) 102A is grounded. When RF sputtering is to be performed, RF power supply 112A is connected to anode plate 104A. (When DC sputtering is to be performed, DC power supply 112A is connected.) When sputtering is to be performed, the output voltage from power supply 112A is applied between grounded cathode plate 102A and anode plate 104A.

Vacuum vessel 100A is connected to evacuating device 114A via gas exhaust port 113A. When sputtering is to be executed, a slight amount of a sputtering gas (e.g., an inert gas such as argon) is injected into vacuum vessel 100A evacuated by evacuating device 114A from gas cylinder 116 through gas supply port 115A and control valve 118A. The injection amount of the sputtering gas is checked by internal pressure sensor (vacuum indicator) 108A attached to vacuum vessel 100A. Sputtering controller 120A as a computer controls substrate rotating motor 110A, magnet 111A, sputtering power supply 112A, evacuating device 114A, and control valve 118A.

Monitor device 106A having a film thickness measuring function is arranged above the sputtering source placed on anode plate 104A. A CPU of controller 120A monitors the amount of sputtering from the sputtering source to the substrate by using monitor device 106A. That is, the CPU of controller 120A is so programmed as to monitor a thin film sputtered on the substrate, and control the RF power from power supply 112A to anode plate 104A such that the thin film layer has a predetermined composition (or a predetermined film thickness).

Note that vacuum vessel 100A shown in FIG. 20 includes a load-lock chamber and process chamber (neither is shown) which function independently of each other during sputtering.

Figure 21:
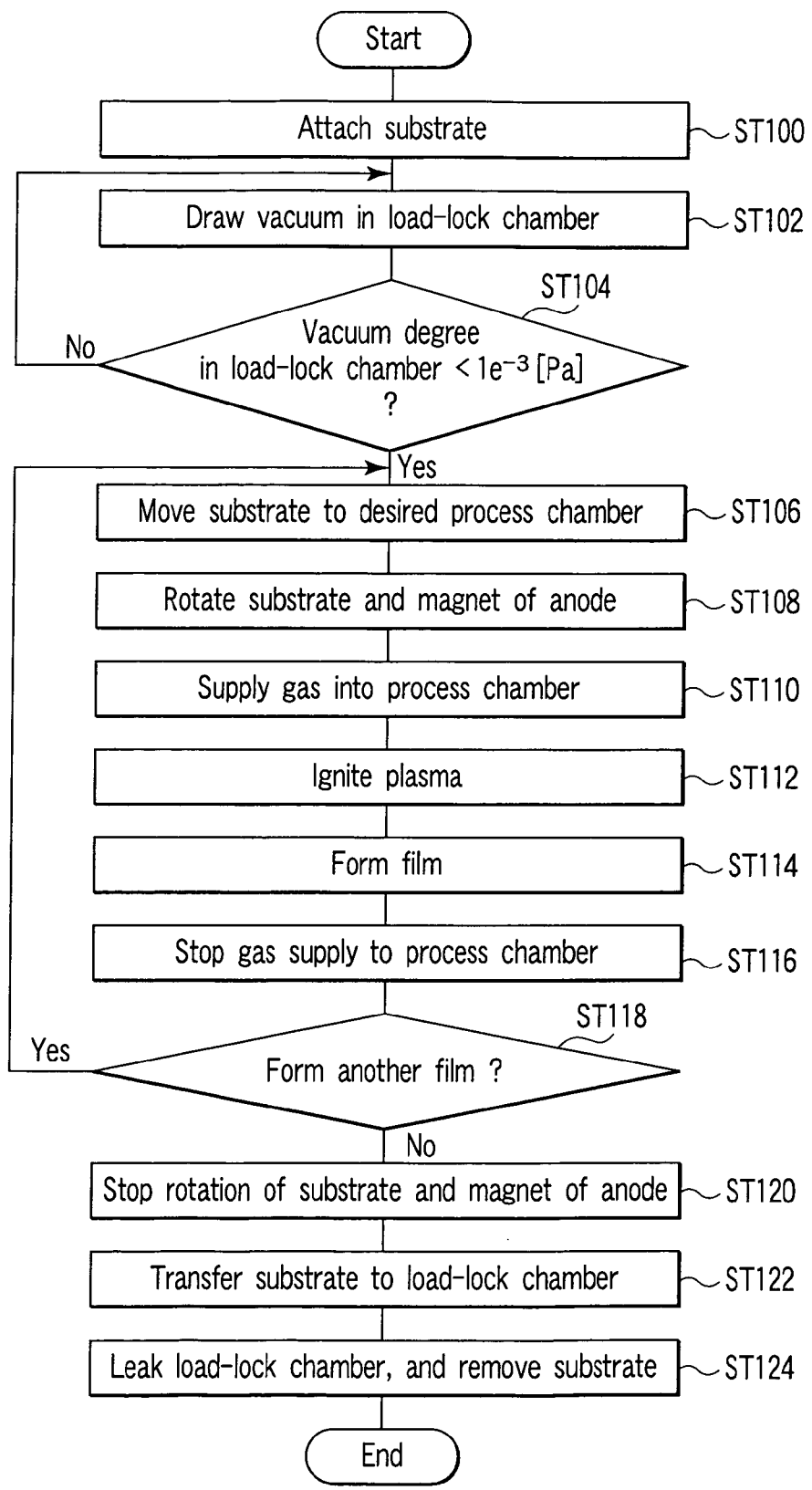
FIG. 21 is a exemplary flowchart for explaining a disc manufacturing process according to an embodiment of the invention.

FIG. 21 is a flowchart for explaining a disc manufacturing process according to an embodiment of the invention. First, substrate 1a/1b is attached to a predetermined portion of the sputtering apparatus (by human hands or a robot arm) (block ST100), and a vacuum is drawn in the internal load-lock chamber of vacuum vessel 100A (block ST102). If internal pressure sensor 108A detects that the vacuum degree in the load-lock chamber is $1 \times 10^{-3}$ (Pa) or less (YES in block ST104), the substrate is moved to the process chamber in vacuum vessel 100A (block ST106). When the substrate is moved to a position where it faces a predetermined target material, the substrate on cathode plate 102A is rotated, and magnet 111A on anode plate 104A is also rotated (block ST108).

After that, a sputtering gas is supplied into the process chamber from gas cylinder 116A (block ST110), and power supply 112A is activated to start plasma ignition (block ST112). Consequently, a thin film corresponding to the composition of the target material is evenly formed on the substrate (block ST114). If film thickness meter 106A detects by monitoring that the thin film having a predetermined thickness is formed, the gas supply to the process chamber is stopped (block ST116) to complete the formation of one thin film.

To further form a thin film on the same substrate (YES in block ST118), the processes in steps ST106 to ST116 are reexecuted. If the composition of the thin film to be formed is different, the target material is changed to the corresponding target material, and the component of the gas to be supplied into the chamber is also changed as needed. For example, the gas can be changed to argon or a gas mixture of argon and nitrogen in accordance with the type of film to be formed.

If all films are formed on the substrate (NO in block ST118), the substrate rotation on cathode plate 102A and the magnet rotation on anode plate 104A are stopped (block ST120). After that, the substrate on which the films are formed is transferred to the load-lock chamber (block ST122), atmospheric air is leaked into the load-lock chamber to release the vacuum state, and substrate 1a/1b having undergone the film formation is removed (by human hands or a robot arm) (block ST124). Then, substrates 1a and 1b having undergone the film formation are adhered as shown in FIG. 1 or 2, thereby completing a single-sided, multi-layer optical disc (e.g., a DVD-RW/RAM for high-density recording).

Figure 22:
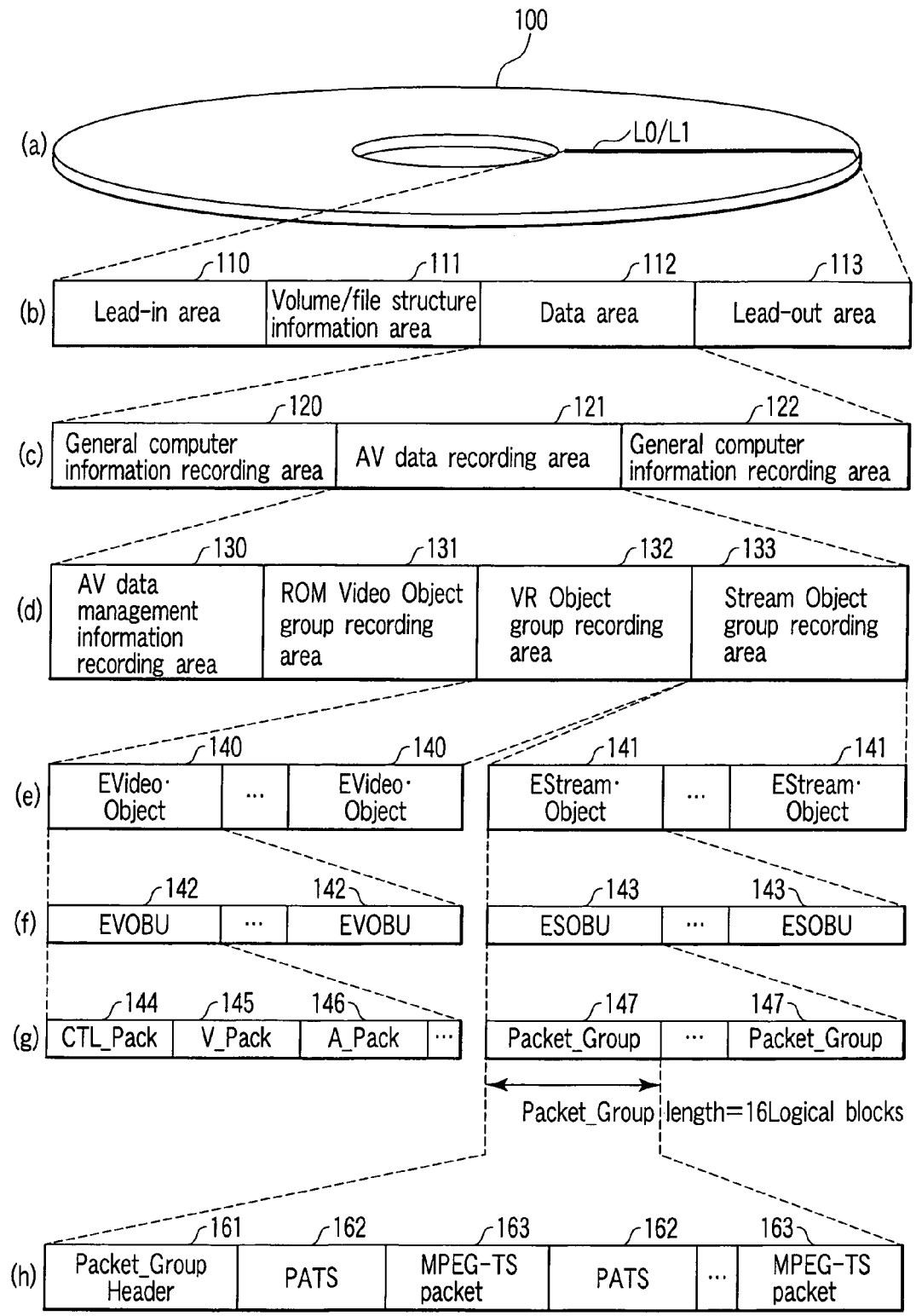
FIG. 22 is an exemplary view for explaining the data structure of information recorded on a disc according to an embodiment of the invention.

FIG. 22 is a view for explaining the data structure of information recorded on the disc completed by the steps as described above. As shown in FIG. 22, data in the disc includes volume/file structure information area 111 that stores a file system, and data area 112 that actually records data files. The file system recorded in volume/file structure information area 111 includes information indicating the recording locations of files. Data area 112 is divided into areas 120 and 122 used to record general computer data, and area 121 that records AV data. AV data recording area 121 includes AV data management information area 130 that stores VMG files used to manage AV data, VR object group recording area (using an MPEG program stream or the like) 132 that records object data files complying with the video recording standard, and stream object recording area (using an MPEG transport stream or the like) 133 which records objects compatible to digital broadcast.

Figure 23:
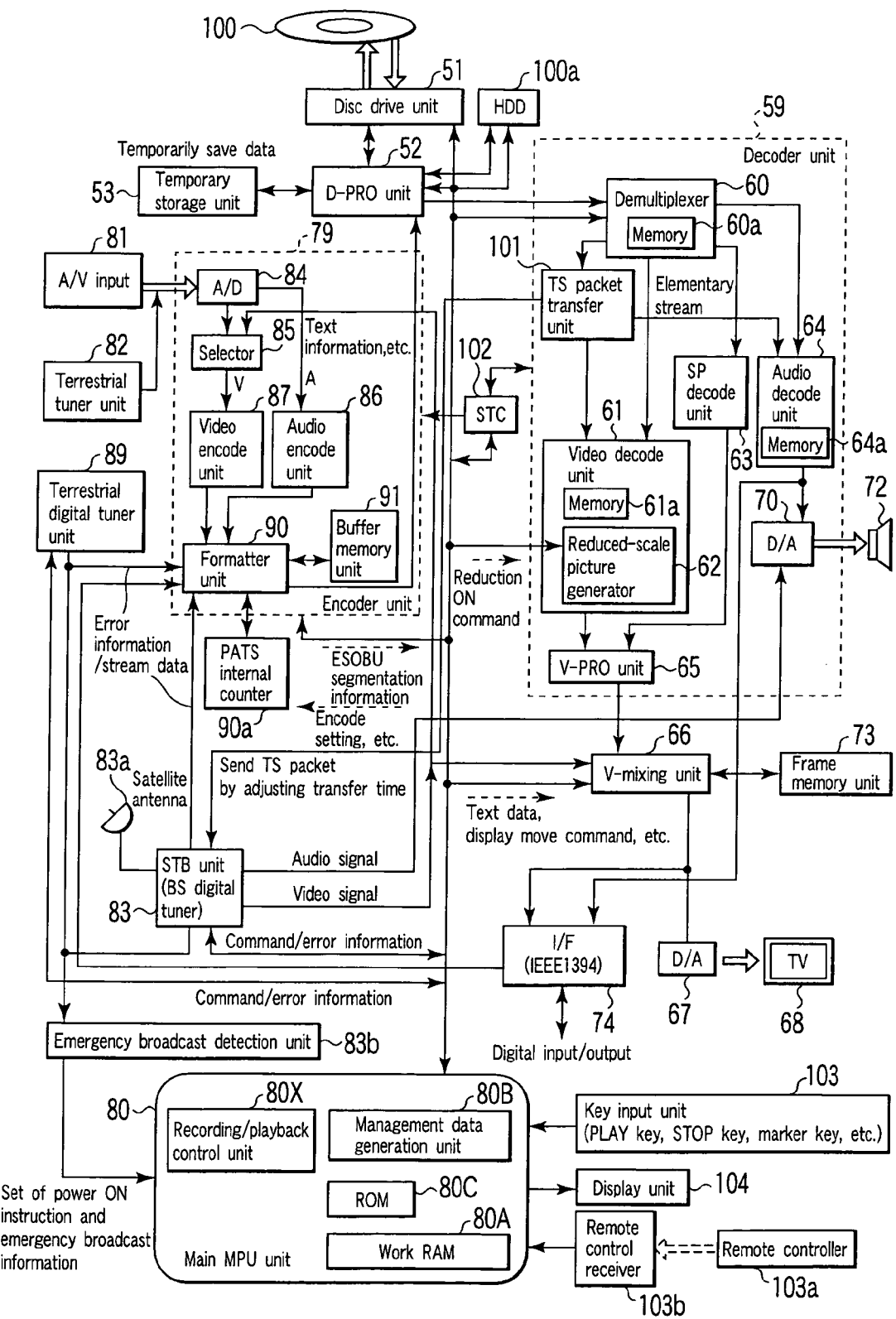
FIG. 23 is an exemplary view for explaining an example of a recording/playback apparatus according to an embodiment of the invention.

FIG. 23 is a block diagram for explaining an example of an apparatus which records and plays back AV information (a digital TV broadcast program or the like) on and from an information recording medium (optical disc, hard disc, or the like) by using the data structure shown in FIG. 22. This apparatus comprises an MPU unit, display unit, decoder unit, encoder unit, TV tuner unit, STC unit (System Time Counter), D-PRO unit, temporary storage unit, disc drive unit, key input unit, V-mixing unit, frame memory unit, TV D/A unit, terrestrial digital tuner unit, IEEE 1394 I/F unit, Ethernet I/F unit, remote controller receiver, STB unit (BS digital tuner or the like), emergency broadcast detection unit, and HDD unit. This arrangement is configured by adding the functions of a streamer to a recordable/reproducible DVD recorder (DVD-VR recorder).

The encoder unit includes an A/D unit, video encode unit, audio encode unit, SP encode unit, formatter unit, and buffer memory unit. The decoder unit includes a demultiplexer, video decode unit, SP decode unit, audio decode unit, TS packet transfer unit, V-PRO unit, and audio D/A unit. In addition, an antenna for receiving digital broadcast is connected to the STB unit. Note that the STC unit is configured to count on a 27-MHz base.

The flow of signals during recording is as follows. That is, TS packet data received by the STB unit (or the terrestrial digital tuner) is packed into packet groups by the formatter unit, and the packet groups are saved on a work RAM. When the saved packet groups reach a predetermined size, they are recorded on a disc. Note that PATS internal counter 90a is connected to formatter unit 90. The arrival time of each TS packet is counted by PATS counter 90a, and the count value is appended to the head of the TS packet when the packet is buffered. Counter 90a can finely adjust the count intervals by SCR, but never loads the SCR values unlike STC 102. The operation at that time is as follows. When TS packets are received, a group is formed every 170 packets, and a packet group header is generated.

In this case, only the two upper bytes of the PATS of the first packet of the packet group are stored in the header, and only the four lower bytes of each of other PATS data are saved together with the TS packet (before the TS packet). An analog signal input from the terrestrial tuner or line input is converted into a digital signal by the A/D unit. This digital signal is input to the individual encoder units. That is, a video signal is input to the video encode unit, an audio signal is input to the audio encode unit, and text data such as teletext broadcasting is input to the SP encode unit. The video signal is compressed by MPEG, the audio signal is compressed by AC3 or MPEG audio, and the text data is compressed by runlength coding.

Each encode unit (for VR) packs the compressed data to form 2,048-byte packets and inputs them to the formatter unit. The formatter unit packs and multiplexes the packets into a program stream, and sends it to the D-PRO unit. The D-PRO unit forms ECC blocks for every 16 logical blocks, appends error correction data to them, and records them on the disc by the drive unit.

If the drive unit is busy due to seek, track jump, or the like, recording information is stored in the HDD buffer unit, and waits until the DVD-RAM drive unit is ready. Furthermore, the formatter unit generates each segmentation information during video recording, and periodically sends it to the MPU unit (GOP head interrupt or the like). The segmentation information includes the number of packs of an EVOBU (ESOBU), the end address of I-picture data from the head of the EVOBU (ESOBU), the playback time of the EVOBU (ESOBU), and the like.

The flow of signals during playback is as follows. That is, data is read out from the disc by the drive unit. The D-PRO performs error correction on the readout data, and inputs the data to the decode unit. The MPU unit determines whether the type of input data is VR data or SR data, and sets the determined type in the decoder unit before playback. If the input data is SR data, the MPU unit determines a PID to be played back on the basis of the information of a cell to be played back, determines the PID of each item (e.g., video or audio) to be played back on the basis of PMT, and sets the PID in the decoder unit. On the basis of this PID, the decoder unit sends the TS packets to the individual decode units by using the demultiplexer, and to the TS packet transfer unit. In accordance with the packet arrival time, the decoder unit transmits the TS packets to the STB unit (1394 I/F unit). The data is decoded by each decode unit, the decoded data is converted into an analog signal by the D/A unit, and the signal is displayed on TV. If the input data is VR data, the demultiplexer sends the data to each decode unit in accordance with a fixed ID. The data is decoded by each decode unit, the decoded data is converted into an analog signal by the D/A unit, and the signal is displayed on TV.

Figure 24:
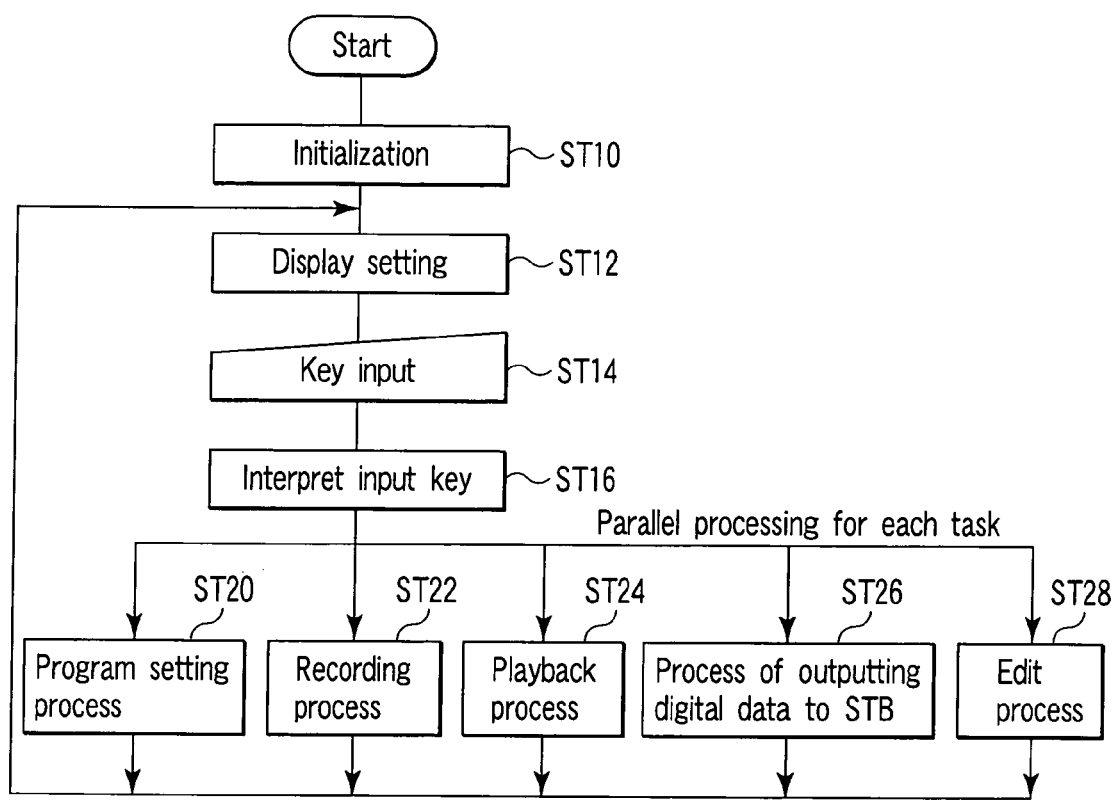
FIG. 24 is an exemplary flowchart for explaining an example of the overall operation of the apparatus shown in FIG. 23.

FIG. 24 is a flowchart (overall operation process flow) for explaining an example of the overall operation of the apparatus shown in FIG. 23. This data processing includes five processes, i.e., a recording process, playback process, data transfer process (e.g., a process of outputting digital data to the STB), program setting process, and edit process. For example, when the apparatus shown in FIG. 23 is poared on, MPU 80 performs initialization (set when the apparatus is shipped from the factory or set by the user after that) (block ST10), performs display setting (block ST12), and waits for a user operation. If the user performs key input from key input unit 103 or remote controller 103a (block ST14), MPU unit 80 interprets the contents of the key input (block ST16). In accordance with the result of this input key interpretation, one of the five data processing operations described below is appropriately executed.

That is, if the key input is a key operation for setting timer reservation recording, the program setting process starts (block ST20). If the key input is a key operation for starting recording, the recording process starts (block ST22). If the key input is a key operation for starting playback, the playback process starts (block ST24). If the key input is a key operation for outputting digital data to the STB, the digital output process starts (block ST26). If the key input is a key operation for starting the edit process, the edit process starts (block ST28).

The processes in blocks ST20 to ST28 are appropriately performed in parallel for each task. For example, while the playback process (block ST24) is executed, the process (block ST26) of outputting digital data to the STB is executed in parallel. Alternatively, while the recording process (block ST22) which is not timer reservation recording is executed, the new program setting process (block ST20) can be executed in parallel. It is also possible to execute the playback process (block ST24) and digital output process (block ST26) in parallel with the recording process (block ST22) by using the characteristic feature of rapidly accessible disc recording. The disc edit process (block ST28) may also be performed while data is being recorded on the HDD.

Figure 25:
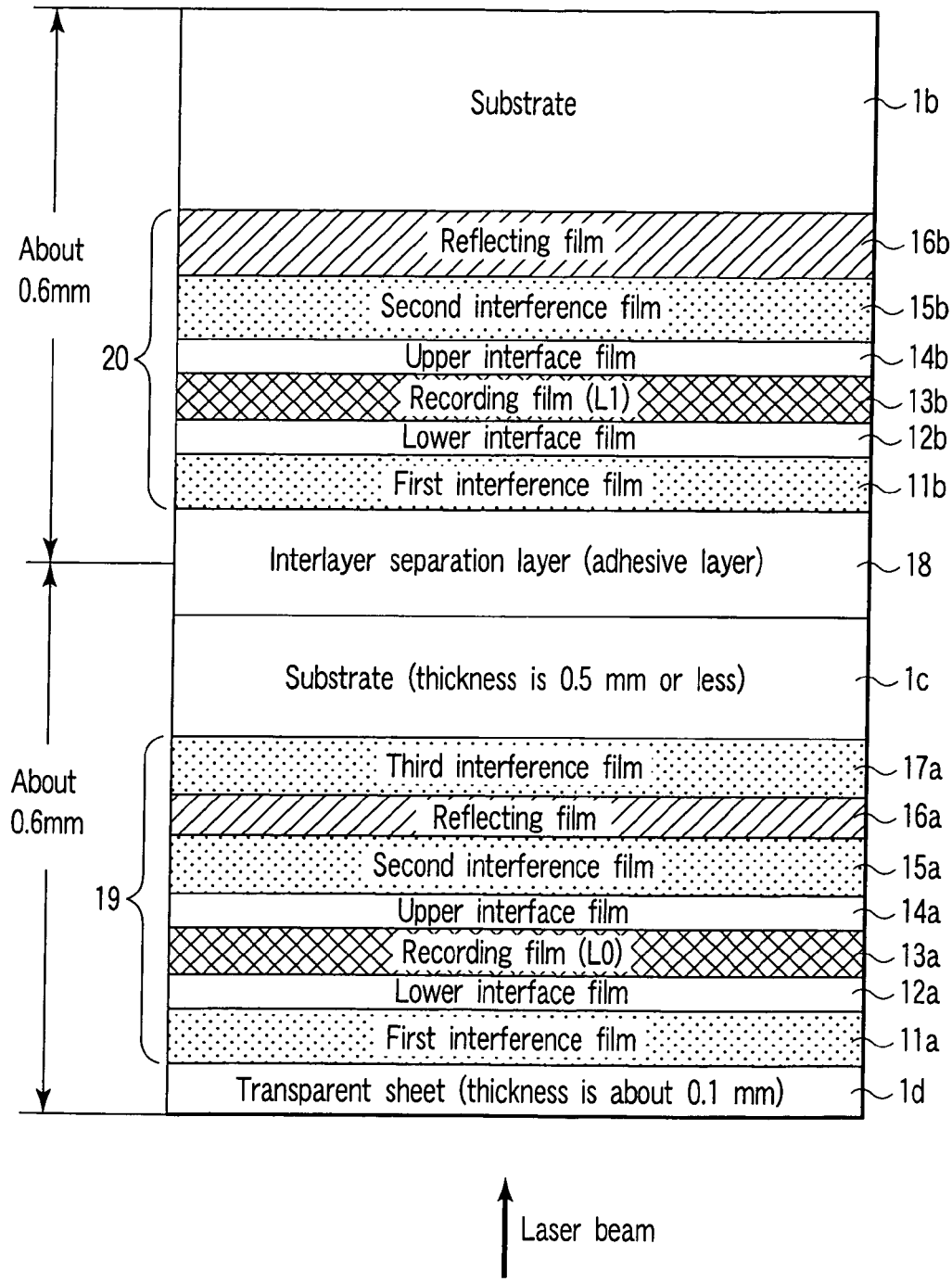
FIG. 25 is an exemplary view for explaining the sectional structure of an optical recording medium (Example 3) according to another embodiment of the invention.

FIG. 25 is a view for explaining the sectional structure of an optical recording medium (Example 3) according to another embodiment of the invention. In Example 3, L0 layer 19 shown in FIG. 1 is formed in a position 0.1 mm from the laser-receiving surface. An objective lens having NA=0.8 to 0.9 is used to perform information read/write to the L0 layer. An objective lens having NA=0.6 to 0.7 is used to perform information read/write to L1 layer 20 formed in a position about 0.6 mm from the laser-receiving surface.

Figure 26:
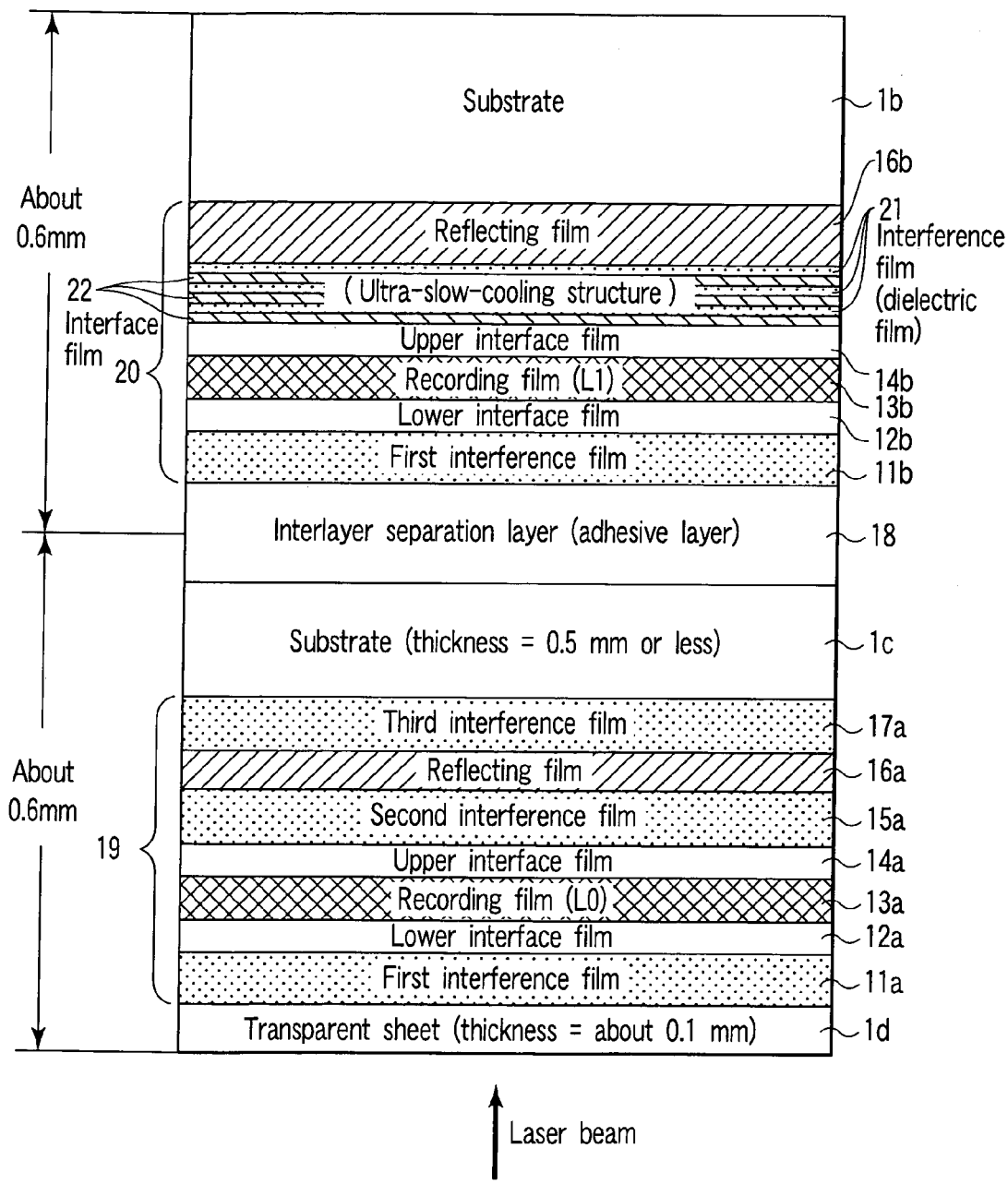
FIG. 26 is an exemplary view for explaining the sectional structure of an optical recording medium (Example 4) according to another embodiment of the invention.

FIG. 26 is a view for explaining the sectional structure of an optical recording medium (Example 4) according to another embodiment of the invention. In Example 4, L0 layer 19 shown in FIG. 2 is formed in a position 0.1 mm from the laser-receiving surface, and an ultra-slow-cooling structure (21+22) is formed in L1 layer 20.

Figure 27:
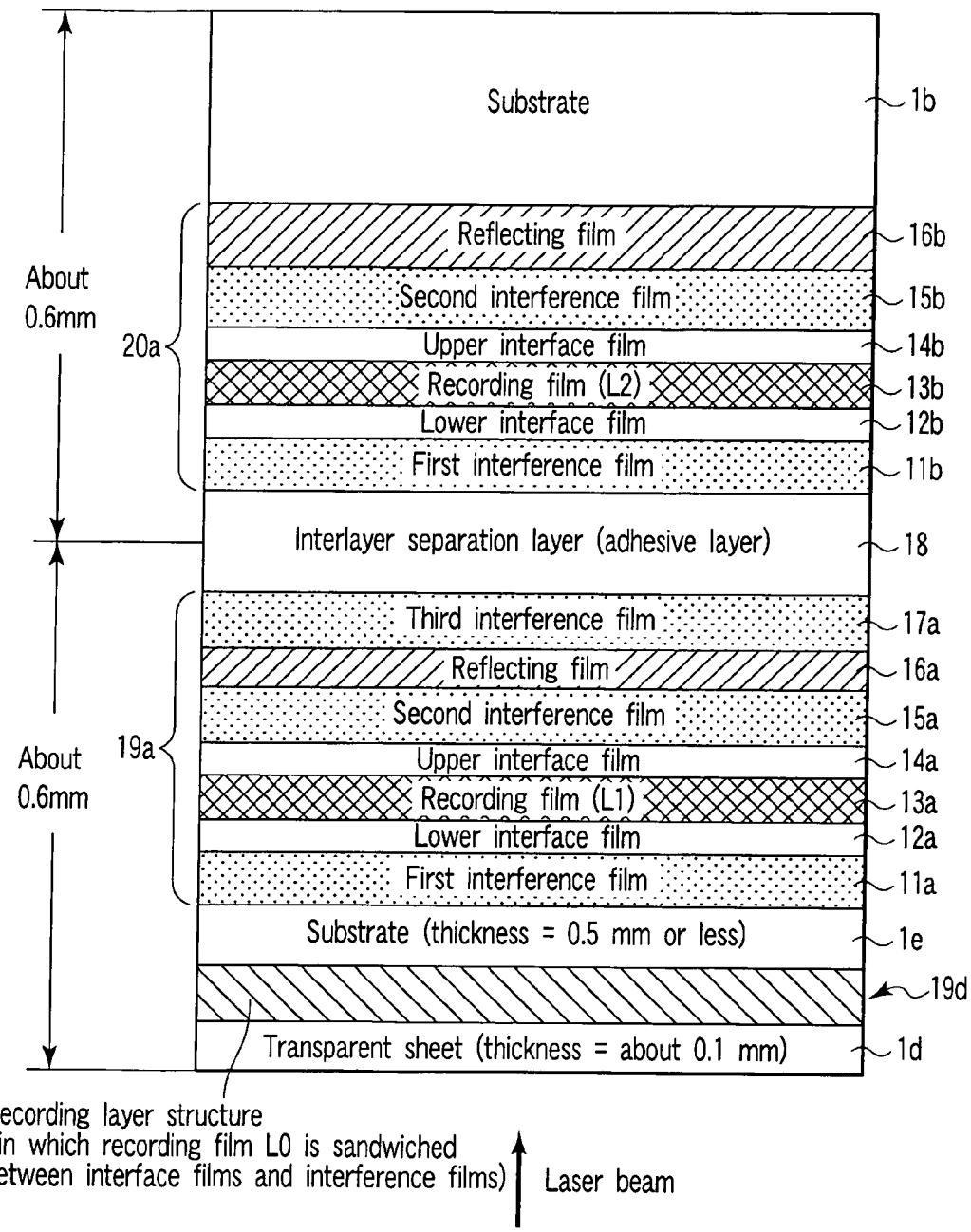
FIG. 27 is an exemplary view for explaining the sectional structure of an optical recording medium (Example 5) according to another embodiment of the invention.

FIG. 27 is a view for explaining the sectional structure of an optical recording medium (Example 5) according to another embodiment of the invention. In Example 5, the structure shown in FIG. 1 or 25 is given a three-layer structure. That is, L1 recording film 13a and L2 recording film 13b are formed in a position about 0.6 mm from the laser-receiving surface, and recording layer structure 19d including an L0 recording film is formed in a position 0.1 mm from the laser-receiving surface.

Figure 28:
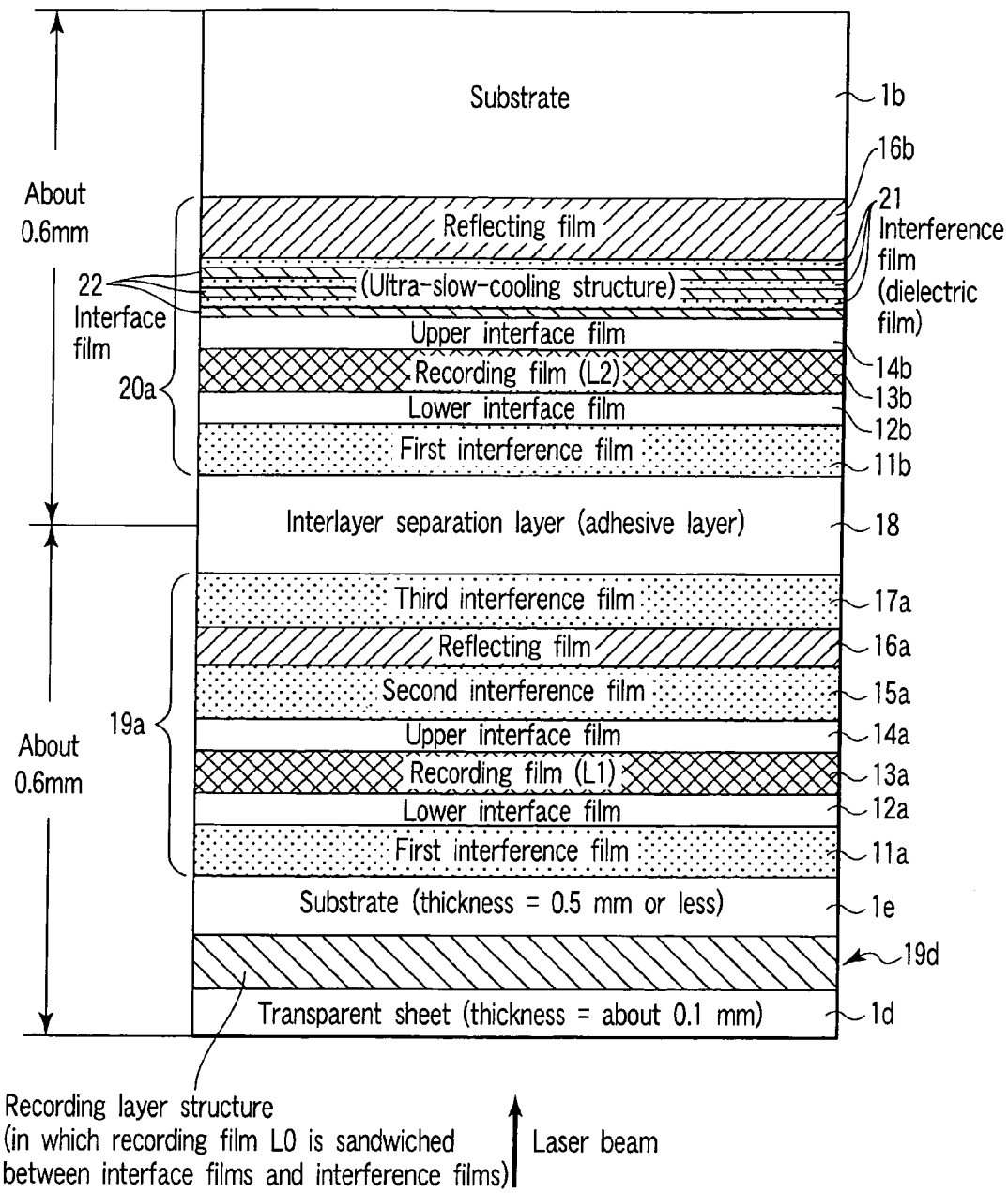
FIG. 28 is an exemplary view for explaining the sectional structure of an optical recording medium (Example 6) according to another embodiment of the invention.

FIG. 28 is a view for explaining the sectional structure of an optical recording medium (Example 6) according to another embodiment of the invention. In Example 6, the ultra-slow-cooling structure (21+22) shown in FIG. 2 is formed in the structure shown in FIG. 27.

Figure 29:
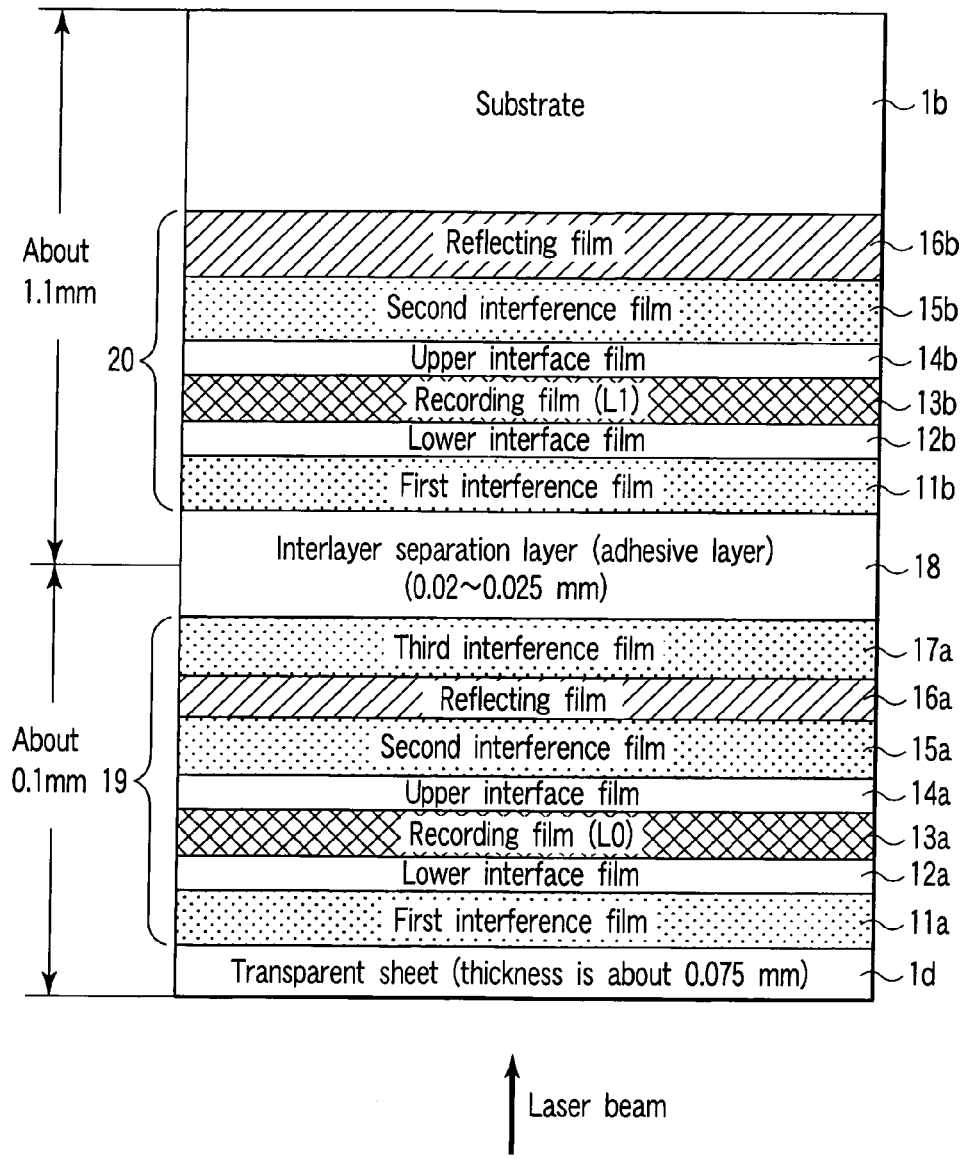
FIG. 29 is an exemplary view for explaining the sectional structure of an optical recording medium (Example 7) according to still another embodiment of the invention.

FIG. 29 is an exemplary view for explaining the sectional structure of an optical recording medium (Example 7) according to still another embodiment of the invention. In Example 7, the L0 side has no substrate. The nominal thickness of the L0 side is selected to be about 0.1 mm, and that of the L1 side is selected to be about 1.1 mm. Further, the thickness of the outer-most transparent sheet is selected to be about 0.075 mm, and that of the separation layer (adhesive layer) is selected to be about 0.02 mm to 0.025 mm.

Figure 30:
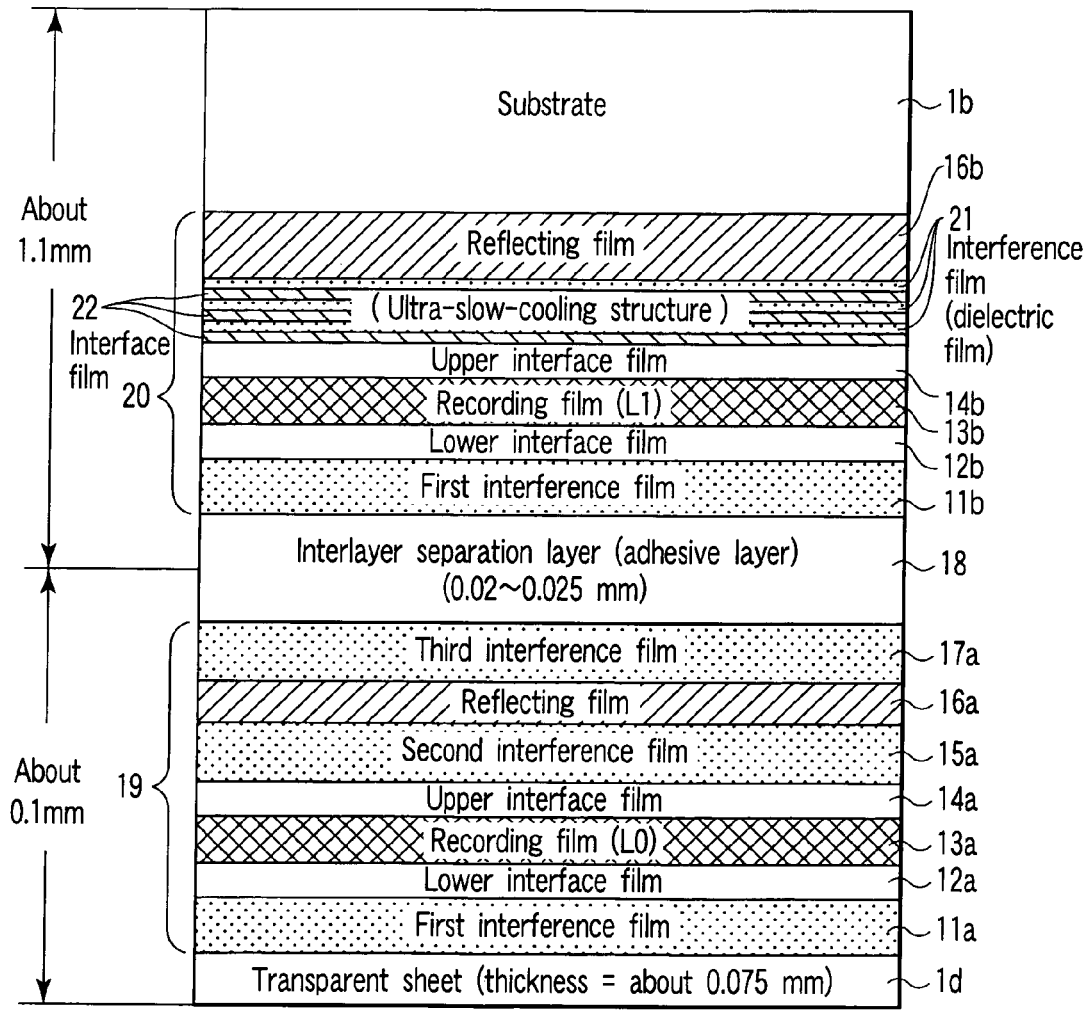
FIG. 30 is an exemplary view for explaining the sectional structure of an optical recording medium (Example 8) according to still another embodiment of the invention.

FIG. 30 is an exemplary view for explaining the sectional structure of an optical recording medium (Example 8) according to still another embodiment of the invention. The configuration of FIG. 30 is similar to but different from that of FIG. 29 in that the L1 side of FIG. 30 has an ultra-slow-cooling structure (21+22).

Figure 31:
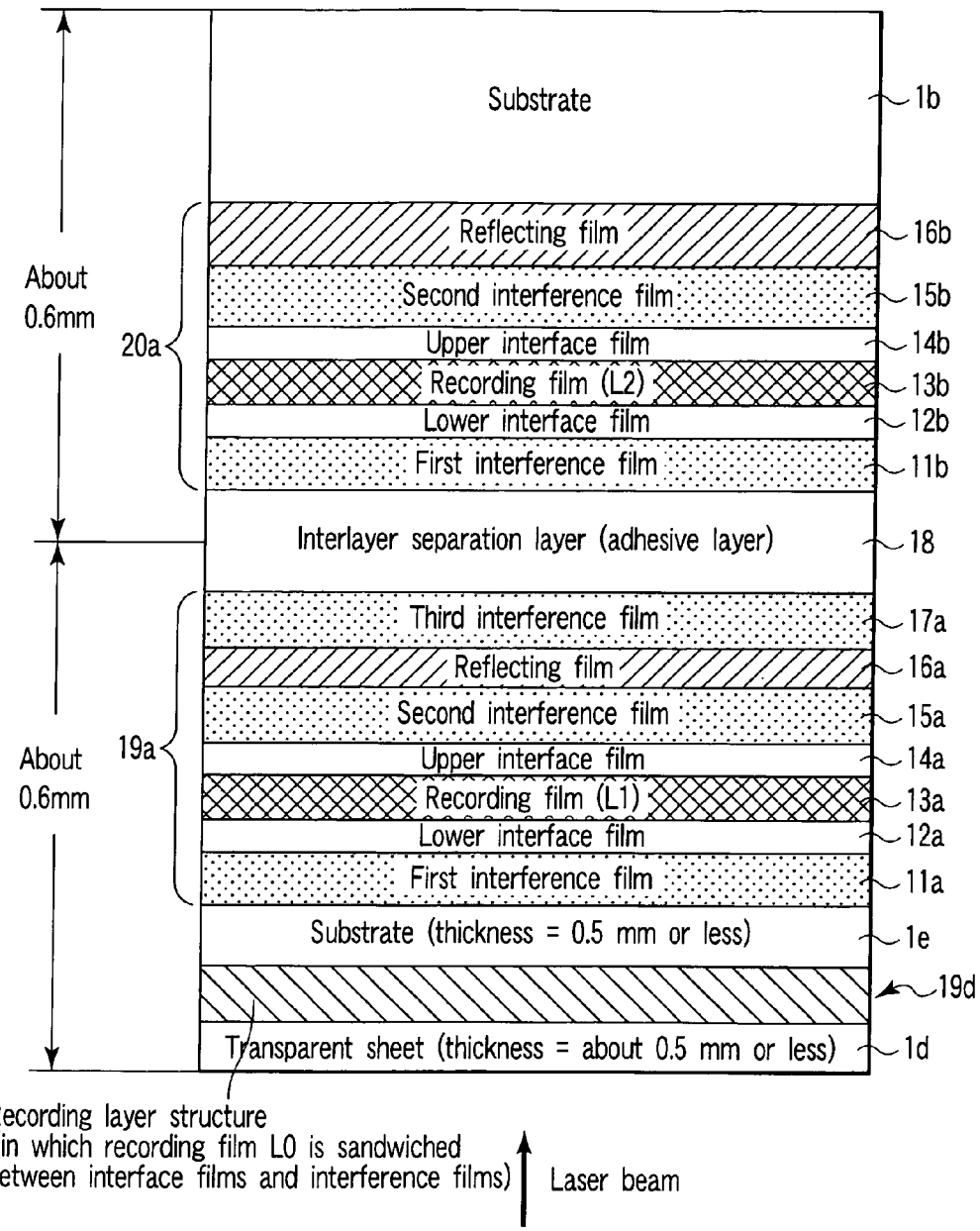
FIG. 31 is an exemplary view for explaining the sectional structure of an optical recording medium (Example 9) according to still another embodiment of the invention.

FIG. 31 is an exemplary view for explaining the sectional structure of an optical recording medium (Example 9) according to still another embodiment of the invention. In Example 9, the thickness of each of substrate 1e and transparent sheet 1d may have about 0.5 mm or less, provided that the total thickness of the L0 side (including substrate 1e and transparent sheet 1d) is fixed at about 0.6 mm.

Figure 32:
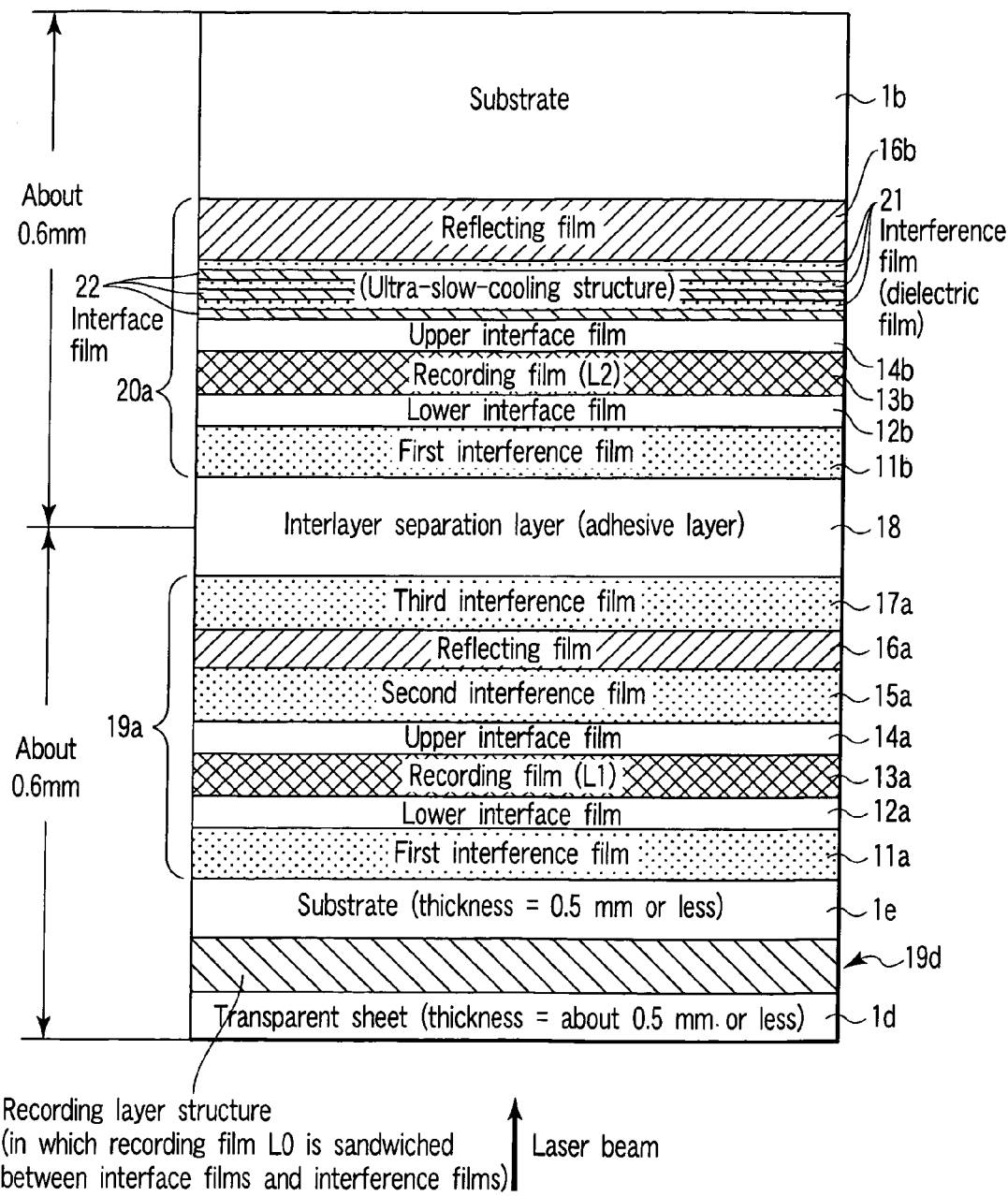
FIG. 32 is an exemplary view for explaining the sectional structure of an optical recording medium (Example 10) according to still another embodiment of the invention.

FIG. 32 is an exemplary view for explaining the sectional structure of an optical recording medium (Example 10) according to still another embodiment of the invention. The configuration of FIG. 32 is similar to but different from that of FIG. 31 in that the L1 side of FIG. 32 has an ultra-slow-cooling structure (21+22).

CONCLUSION

An indispensable condition for practicing the invention is that a thin film made of Zr (zirconium), O (oxygen), N (nitrogen), and one or both of Y (yttrium) and Nb (niobium) is formed in contact with a recording film which reversibly changes the atomic arrangement. Therefore, other films are of course not limited to the materials explained in the above embodiments. It is also possible, without departing from the spirit and scope of the invention, to add a slight amount of a material such as Co, V, or Ag, other than Sn, Bi and In to GeSbTe or GeBiTe as the recording film material, provided that the effects of the invention are not spoiled. The expression "in contact" has the meaning that even if an ultra-thin oxide film (thickness=0 to 2 nm) naturally formed during film formation is detected by Auger analysis or the like, the expression "in contact" is still applicable. That is, the expression "in contact" used in the invention can be applied unless a film containing no zirconium is intentionally inserted between the recording film and interface film.

In addition, the embodiments do not limit the thickness of the substrate or the order of films to be formed, and the invention is similarly applicable to a medium which receives light through a substrate on which films are to be formed, and to a medium which receives light through a transparent sheet adhered to a substrate on which films are formed. For example, the above explanation reveals that the invention is also effective for a recording medium for which an objective lens having a high NA of about 0.85 is used, and which has a transparent sheet about 0.1 mm thick on the light incident side. Furthermore, the wavelength of a laser used is not limited to 405 nm and its vicinity. That is, the interface layer material is practically transparent to shorter wavelengths of 350 and 250 nm and their vicinities owing to the optical characteristics of the material, so the invention is effective for these wavelengths.

The invention is practiced in view of the following points. That is, a recording medium which reversibly records and erases data by using light comprises a substrate, a recording film capable of reversibly changing the atomic arrangement, and a thin film in contact with the recording film. At least one layer (interface layer) of this thin film is made of Zr (zirconium), O (oxygen), N (nitrogen), and one or both of Y (yttrium) and Nb (niobium). The thin film is obtained by sputtering a sputtering target made of, e.g., $ZrO_2+Y_2O_3$, $ZrO_2+Nb_2O_5$, or $ZrO_2+Y_2O_3+Nb_2O_5$ by using a gas mixture containing an inert gas such as Ar and nitrogen ($N_2$) gas, or nitrogen ($N_2$) gas alone, or by sputtering a sputtering target made of, e.g., $ZrO_2+ZrN+Y_2O_3$ by using an inert gas such as Ar, a gas mixture containing an inert gas such as Ar and nitrogen ($N_2$) gas, or nitrogen ($N_2$) gas alone.

Ce (cerium) and Mg (magnesium) also have the same effects as Y (yttrium) and Nb (niobium). In this case, it is possible to use sputtering targets such as $ZrO_2+CeO_2$ and $ZrO_2+MgO$, and it is also possible to substitute Y or Nb with one or both of Ce and Mg.

A recording medium which reversibly records and erases data by using light comprises a substrate, a recording film capable of reversibly changing the atomic arrangement, and a thin film in contact with the recording film. At least one layer (interface layer) of this thin film is made of Zr (zirconium), O (oxygen), N (nitrogen), and one or both of Y (yttrium) and Nb (niobium). N is placed by substituting the site of O, and the compound is made of Zr, O, and N. In this optical recording medium, the thin film is represented by $(Zro_{2-x}N_x)_{1-y}((Y_2O_3)_{1-z}(Nb_2O_5)_z)_y$ wherein the composition ratio is preferably ($0<x\leq0.5$, $0<y\leq0.1$, and $0\leq z\leq 1$), and more preferably, ($0<x\leq0.2$, $0<y\leq0.1$, and $0\leq z\leq 1$).

Although the above composition contains $Y_2O_3$ and $Nb_2O_5$, it is very difficult to determine an element to which oxygen in the film bonds. When microscopic analysis is performed, therefore, a perfect compound such as $Y_2O_3$ or $Nb_2O_5$ having no composition difference is not formed. The above description is based on the arrangement of the starting material, and does not depart from the spirit and scope of the invention even if the composition is found to be different from $Y_2O_3$ or $Nb_2O_5$ by analysis. It is well known that there is a slight composition difference between the composition of a sputtering target and the compositions of thin films formed under various conditions. Generally, compositions having a difference of about ±1 [at. %] are regarded as the same composition except for special cases.

A recording medium which reversibly records and erases data by using light comprises a substrate, a recording film capable of reversibly changing the atomic arrangement, and a thin film in contact with the recording film. At least one layer (interface layer) of this thin film is made of Zr (zirconium), O (oxygen), N (nitrogen), and one or both of Y (yttrium) and Nb (niobium). The extinction coefficient of the thin film is preferably $1\times10^{-2}$ or less, and more preferably, $1\times10^{-3}$ or less (when a wavelength λ is 250 to 1,000 nm).

A recording medium which reversibly records and erases data by using light comprises a substrate, a recording film capable of reversibly changing the atomic arrangement, and a thin film in contact with the recording film. At least one layer (interface layer) of this thin film is made of Zr (zirconium), O (oxygen), N (nitrogen), one or both of Y (yttrium) and Nb (niobium), and at least one element selected from the sixth element group described below:

sixth element group: Hf (hafnium), Ti (titanium), Ta (tantalum), Ge (germanium), Si (silicon), Ce (cerium), and Mg (magnesium).

Note that the compound made of Zr (zirconium), O (oxygen), N (nitrogen), and one or both of Y (yttrium) and Nb (niobium) is a dielectric material showing good characteristics as a so-called protective film such as ZnS—$SiO_2$. $ZrO_2$ has a relatively low thermal conductivity when used as a protective film material of an optical disc, and the thermal conductivity and optical constant of a thin film made of Zr, O, N, and the like can be changed. This is very useful, i.e., this thin film is very suitable as, e.g., a dielectric layer (third interference film 17a in the example shown in FIG. 1) as the top layer of L0 of a single-sided dual-layer medium.

The thermal conductivity and optical constant of pure $ZrO_2$ can be changed to some extent by controlling the oxygen deficient amount. However, it is very difficult to precisely control the oxygen deficient amount. It is easiest to use pure $ZrO_2$ as the protective film. However, this material cannot be used as the protective film material of an optical disc without increasing the stability during the manufacture and the stability to the environment, i.e., the storage stability.

High-speed recording such as double-speed, fourfold-speed, or eightfold-speed recording cannot be performed in the future unless the intensity of a laser used is increased. Especially in L1, recording and erase are performed using a laser beam which is substantially reduced by half by extinction when passing through L0. The intensity of the blue-violet LD is steadily increasing. However, L1 is substantially four times as sensitive as L0, recording or erase may not be performed if the sensitivity decreases even slightly. Therefore, increasing the sensitivity of the medium is always desired.

A recording medium which reversibly records and erases data by using light comprises a substrate, a recording film capable of reversibly changing the atomic arrangement, an interface layer thin film adjacent to the recording film, and a metal reflecting film adjacent to the interface layer thin film. To satisfy optical adjustment and heat balance at the same time, a multi-layer film including three or more layers equal in refractive index and different in material is formed between the recording film or the interface layer thin film and the metal reflecting film. At least one layer of this multi-layer film is made of Zr (zirconium), O (oxygen), and N (nitrogen). The inventors call this structure a Response Enhanced Dielectric Multi Layer (REDML) structure or Thermal Response Controlled Dielectric Multi Layer (TRC) structure.

The above arrangement also has the purpose of increasing the sensitivity of the medium. ZnS—$SiO_2$ which is the most popular protective film material of an optical disc is often used in a portion "between the recording film and reflecting film" which greatly helps cool the recording film. The degree of cooling in this portion cannot be adjusted without changing the film thickness of ZnS—$SiO_2$. In this case (in a case in which the film thickness of ZnS—$SiO_2$ is changed), the optical characteristics of the medium also change. The thermal conductivity of ZnS—$SiO_2$ remains almost unchanged when only the film texture is somewhat changed.

On the other hand, if ZnS—$SiO_2$ is replaced with another material, other problems arise, e.g., the optical characteristics change, and the overwrite (OW) characteristics deteriorate. Also, of dielectric materials used in an optical disc, the thermal conductivity of ZnS—$SiO_2$ is relatively low. To increase the sensitivity, therefore, the recording film is held at a high temperature for a certain time period, and then the heat is rapidly dissipated from the longitudinal direction to the sectional direction of the film. In the REDML structure or TRC structure according to the invention described above, it is possible to delay unsteady heat conduction in the thin stacked film or decrease the effective thermal conductivity in a steady state, by hardly changing the optical characteristics of the thin stacked film. Therefore, these structures are very effective to increase the sensitivity of the medium.

The recording film contains at least Ge, Sb, and Te, and has a composition surrounded by x=55·z=45, x=45·z=55, x=10·y=28·z=42, and x=10·y=36·z=54 on a GeSbTe ternary phase diagram, when the composition is represented by $Ge_x Sb_y Te_z$ wherein x+y+z=100. This recording film is obtained by sputtering a sputtering target having the above composition by using an inert gas such as Ar gas. Note that Ge in the recording film relatively easily oxidizes. Oxygen is contained, albeit in a slight amount, in the sputtering target as the starting material and in the inert gas such as Ar used in sputtering. Therefore, a slight amount of oxygen unavoidably mixes in the recording film. In addition, a thin film made of Zr (zirconium), O (oxygen), N (nitrogen), and one or both of Y (yttrium) and Nb (niobium), i.e., a thin oxide film is used as the layer in contact with the recording film. Since a slight amount of oxygen diffuses in the recording film, the oxygen amount further increases. Therefore, even if oxygen (O) or the like is detected in addition to Ge, Sb, and Te, the recording film does not depart from the spirit and scope of the invention. It is also well known that there is a slight composition difference between the composition of a sputtering target and the compositions of thin films formed as recording films under various conditions. Generally, compositions having a difference of about ±1 [at. %] are regarded as the same composition except for special cases.

The recording film contains at least Ge, Sb, and Te, and has a composition which is obtained by partially substituting the composition within the above-mentioned range with Bi and/or Sn, and satisfies $0 \leq w < 0.5$ and $0 < v < 0.7$ when the substituted composition is represented by $(Ge_w Sn_{(1-w)})_x (Sb_v Bi_{(1-v)})_y Te_z$ wherein $x+y+z=100$. The recording film is obtained by sputtering a sputtering target having the above composition by using an inert gas such as Ar.

Or, the recording film contains at least Ge, Sb, and Te, and has a composition which is obtained by partially substituting the composition within the above-mentioned range with Bi and/or Sn and/or In, and satisfies $0 \leq w < 0.5$ and $0 \leq v < 0.7$ and $0 < u < 1.0$ when the substituted composition is represented by $(Ge_{(1-w)} Sn_w)_x (Sb_v (Bi_{(1-u)} In_u)_{(1-v)})_y Te_z$ wherein $x+y+z=100$. The recording film is obtained by sputtering a sputtering target having the above composition by using an inert gas such as Ar.

Note that Ge in the recording film relatively easily oxidizes. Oxygen is contained, albeit in a slight amount, in the sputtering target as the starting material and in the inert gas such as Ar used in sputtering. Therefore, a slight amount of oxygen unavoidably mixes in the recording film. In addition, a thin film made of Zr (zirconium), O (oxygen), N (nitrogen), and one or both of Y (yttrium) and Nb (niobium), i.e., a thin oxide film is used as the layer in contact with the recording film. Since a slight amount of oxygen diffuses in the recording film, the oxygen amount further increases. Therefore, even if oxygen (O) or the like is detected in addition to Ge, Sb, Te, and Sn/Bi (or Sn/Bi/In), the recording film does not depart from the spirit and scope of the invention.

The recording film contains at least Ge, Bi, and Te, and has a composition surrounded by $x=55 \cdot z=45$, $x=45 \cdot z=55$, $x=10 \cdot y=28 \cdot z=42$, and $x=10 \cdot y=36 \cdot z=54$ on a GeBiTe ternary phase diagram, when the composition is represented by $Ge_x Bi_y Te_z$ wherein $x+y+z=100$. Ge in the recording film relatively easily oxidizes in this case as well. The recording film is obtained by sputtering a sputtering target having the above composition by using an inert gas such as Ar.

Note that Ge in the recording film relatively easily oxidizes. Oxygen is contained, albeit in a slight amount, in the sputtering target as the starting material and in the inert gas such as Ar used in sputtering. Therefore, a slight amount of oxygen unavoidably mixes in the recording film. In addition, a thin film made of Zr (zirconium), O (oxygen), N (nitrogen), and one or both of Y (yttrium) and Nb (niobium), i.e., a thin oxide film is used as the layer in contact with the recording film. Since a slight amount of oxygen diffuses in the recording film, the oxygen amount further increases. Therefore, even if oxygen (O) or the like is detected in addition to Ge, Bi, and Te, the recording film does not depart from the spirit and scope of the invention.

The recording film contains at least Ge, Sb, Te, and N (nitrogen), and is obtained by adding 1 to 5 at. % of N (nitrogen) to a GeSbTe-based compound in a composition region surrounded by $x=55 \cdot z=45$, $x=45 \cdot z=55$, $x=10 \cdot y=28 \cdot z=42$, and $x=10 \cdot y=36 \cdot z=54$ on a GeSbTe ternary phase diagram, when the composition of Ge, Sb, and Te is represented by $Ge_x Sb_y Te_z$ wherein $x+y+z=100$. Note that the added nitrogen is not always uniformly distributed in the film, but may also be nonuniformly distributed in accordance with the film formation conditions. In this case, the addition amount is analyzed and evaluated by the total amount in the film to which nitrogen is added. Also, if nitrogen is contained in the layer in contact with the recording film as in this example, nitrogen sometimes diffuses from the layer in contact with the recording film. Ge in the recording film relatively easily oxidizes in this case as well. The recording film is obtained by sputtering a sputtering target having the above composition by using an inert gas such as Ar.

Note that Ge in the recording film relatively easily oxidizes. Oxygen is contained, albeit in a slight amount, in the sputtering target as the starting material and the inert gas such as Ar used in sputtering. In addition, if a gas containing nitrogen ($N_2$) is used as the sputtering gas, a slight amount of oxygen (O) is contained in the sputtering gas. Therefore, a slight amount of oxygen unavoidably mixes in the recording film. Furthermore, a thin film made of Zr (zirconium), O (oxygen), N (nitrogen), and one or both of Y (yttrium) and Nb (niobium), i.e., a thin oxide film is used as the layer in contact with the recording film. Since a slight amount of oxygen diffuses in the recording film, the oxygen amount further increases. Therefore, even if oxygen (O) or the like is detected in addition to Ge, Sb, and Te, the recording film does not depart from the spirit and scope of the invention.

The recording film contains at least Ge, Sb, Te, and N (nitrogen), and is obtained by adding 1 to 5 at. % of N (nitrogen) to a GeSbTe-based compound in a composition region surrounded by $x=55 \cdot z=45$, $x=45 \cdot z=55$, $x=10 \cdot y=28 \cdot z=42$, and $x=10 \cdot y=36 \cdot z=54$ on a GeSbTe ternary phase diagram, when the composition of Ge, Sb, and Te is represented by $Ge_x Sb_y Te_z$ wherein $x+y+z=100$. Note that the added nitrogen is not always uniformly distributed in the film, but may also be nonuniformly distributed in accordance with the film formation conditions. In this case, the addition amount is analyzed and evaluated by the total amount in the film to which nitrogen is added. Also, if nitrogen is contained in the layer in contact with the recording film as in this example, nitrogen sometimes diffuses from the layer in contact with the recording film. Ge in the recording film relatively easily oxidizes in this case as well. The recording film is obtained by sputtering a sputtering target having the above composition by using an inert gas such as Ar.

Or, the recording film contains at least Ge, Sb, Te, and N (nitrogen), and is obtained by adding 1 to 5 at. % of N (nitrogen) to a GeSnSbTe-, GeSbTeBi-, or GeSnSbTeBi-based compound in a composition region which is obtained by partially substituting, with Bi and/or Sn, a composition within a range surrounded by $x=55 \cdot z=45$, $x=45 \cdot z=55$, $x=10 \cdot y=28 \cdot z=42$, and $x=10 \cdot y=36 \cdot z=54$ on a GeSbTe ternary phase diagram, when the composition of Ge, Sb, and Te is represented by $Ge_x Sb_y Te_z$ wherein $x+y+z=100$, and which satisfies $0 \leq w < 0.5$ and $0 \leq v < 0.7$ and $0 \leq u \leq 1.0$, when the substituted composition is represented by $(Ge_{(1-w)} Sn_w)_x (Sb_v (Bi_{(1-u)} In_u)_{(1-v)})_y Te_z$ wherein $x+y+z=100$. Note that the added nitrogen is not always uniformly distributed in the film, but may also be nonuniformly distributed in accordance with the film formation conditions. In this case, the addition amount is analyzed and evaluated by the total amount in the film to which nitrogen is added. Also, if nitrogen is contained in the layer in contact with the recording film as in this example, nitrogen sometimes diffuses from the layer in contact with the recording film. Ge in the recording film relatively easily oxidizes in this case as well. The recording film is obtained by sputtering a sputtering target having the above composition by using an inert gas such as Ar.

Note that Ge in the recording film relatively easily oxidizes. Oxygen is contained, albeit in a slight amount, in the sputtering target as the starting material and in the inert gas such as Ar used in sputtering. In addition, if a gas containing nitrogen ($N_2$) is used as the sputtering gas, a slight amount of oxygen (O) is contained in the sputtering gas. Therefore, a slight amount of oxygen unavoidably mixes in the recording film. Furthermore, a thin film made of Zr (zirconium), O (oxygen), N (nitrogen), and one or both of Y (yttrium) and Nb (niobium), i.e., a thin oxide film is used as the layer in contact with the recording film. Since a slight amount of oxygen diffuses in the recording film, the oxygen amount further increases. Therefore, even if oxygen (O) or the like is detected in addition to Ge, Sb, Te, and Sn/Bi, the recording film does not depart from the spirit and scope of the invention.

The recording film contains at least Ge, Bi, Te, and N (nitrogen), and is obtained by adding 1 to 5 at. % of N (nitrogen) to a GeBiTe-based compound in a composition region surrounded by $x=55 \cdot z=45$, $x=45 \cdot z=55$, $x=10 \cdot y=28 \cdot z=42$, and $x=10 \cdot y=36 \cdot z=54$ on a GeBiTe ternary phase diagram, when the composition of Ge, Bi, and Te is represented by $Ge_xBi_yTe_z$ wherein $x+y+z=100$. Note that the added nitrogen is not always uniformly distributed in the film, but may also be nonuniformly distributed in accordance with the film formation conditions. In this case, the addition amount is analyzed and evaluated by the total amount in the film to which nitrogen is added. Also, if nitrogen is contained in the layer in contact with the recording film as in this example, nitrogen sometimes diffuses from the layer in contact with the recording film. Ge in the recording film relatively easily oxidizes in this case as well. The recording film is obtained by sputtering a sputtering target having the above composition by using an inert gas such as Ar.

Note that Ge in the recording film relatively easily oxidizes. Oxygen is contained, albeit in a slight amount, in the sputtering target as the starting material and in the inert gas such as Ar used in sputtering. In addition, if a gas containing nitrogen ($N_2$) is used as the sputtering gas, a slight amount of oxygen (O) is contained in the sputtering gas. Therefore, a slight amount of oxygen unavoidably mixes in the recording film. Furthermore, a thin film made of Zr (zirconium), O (oxygen), N (nitrogen), and one or both of Y (yttrium) and Nb (niobium), i.e., a thin oxide film is used in the layer in contact with the recording film. Since a slight amount of oxygen diffuses in the recording film, the oxygen amount further increases. Therefore, even if oxygen (O) or the like is detected in addition to Ge, Bi, and Te, the recording film does not depart from the spirit and scope of the invention.

The material series and compositions of these recording films are selected in accordance with the target crystallization rate and medium sensitivity, and with the optical characteristics such as the reflectance, contrast, and transmittance of the medium. However, the ranges described above are favorable.

As described above, in a phase change optical recording medium which records data by using a recording film which reversibly changes the atomic arrangement, a film in contact with the recording film comprises a thin film made of zirconium (Zr), oxygen (O), nitrogen (N), and one or both of yttrium (Y) and niobium (Nb). Accordingly, an intended mark width is obtained during recording without any recrystallization. This makes it possible to ensure a high CNR and a low bit error rate, and obtain a high erase ratio and good cross erase characteristics. Also, a multi-layer film which is called an REDML structure or TRC structure by the inventors is formed between a recording film or an interface layer thin film in contact with the recording film and a metal reflecting film. This multi-layer film includes three or more layers equal in refractive index and different in material, and has the purpose of achieving optical adjustment and heat balance at the same time. At least one layer of this multi-layer film is made of Zr (zirconium), O (oxygen), nitrogen (N), and one or both of Y (yttrium) and Nb (niobium). This structure achieves favorable heat conduction characteristics and a high optical constant at the same time. Therefore, this multi-layer film can have the functions of both a transparent interference layer such as $ZnS:SiO_2$ which is conventionally regarded as indispensable, and an interface film. Accordingly, an optical recording medium which is simple in arrangement and easy to manufacture can be provided.

That is, it is possible by practicing the invention to provide a phase change optical recording medium capable of recording and rewriting data at a high speed and high density, and provide a multi-layer recording medium having these characteristics. More specifically, an embodiment of the invention can provide a phase change recording medium capable of preventing unnecessary recrystallization of a recording mark in a melted portion during recording, achieving a high CNR and high erase ratio at the same time, and reducing cross erase.

Note that the invention is not limited to the embodiments described previously, and can be variously modified without departing from the spirit and scope of the invention when practiced at present or in the future on the basis of techniques usable at that time. Also, the individual embodiments may also be appropriately combined as much as possible when practiced. In this case, the combined effects can be obtained. Furthermore, these embodiments include inventions in various stages, so various inventions can be extracted by properly combining a plurality of disclosed constituent elements. For example, even when some of all the constituent elements disclosed in the embodiments are deleted, an arrangement from which these constituent elements are deleted can be extracted as an invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An optical recording medium comprising
a substrate,
a recording film formed on the substrate and configured to reversibly change an atomic arrangement, and
an adjacent layer adjacent to the recording film, and configured to reversibly perform recording and/or erase on the recording film by using light,
wherein the adjacent layer comprises at least one sublayer,
wherein at least one sublayer of the adjacent layer comprises zirconium (Zr), oxygen (O), nitrogen (N), and at least one of yttrium (Y) and niobium (Nb),
wherein a composition of said at least one sublayer is represented by $(ZrO_{2-x}N_x)_{1-y}((Y_2O_3)_{1-z}(Nb_2O_5)_z)_y$, wherein $0<x\leqq0.5$, $0<y\leqq0.1$, and $0\leqq z\leqq1$, and wherein a composition ratio x, y, z of the $(ZrO_{2-x}N_x)_{1-y}((Y_2O_3)_{1-z}(Nb_2O_5)_z)_y$, is determined such that an extinction coefficient of the one sublayer is $1\times10^{-2}$ or less within a range of 250 nm $\leqq\lambda\leqq$ 1,000 nm provided that a wavelength of the light is represented by $\lambda$.

2. The medium according to claim 1, wherein
the adjacent layer comprises at least one sublayer,
at least one sublayer of the adjacent layer comprises zirconium (Zr), oxygen (O), and nitrogen (N),
nitrogen (N) is placed by substituting a site of oxygen (O), and
said at least one sublayer comprises a compound of zirconium (Zr), oxygen (O), and nitrogen (N).

3. The medium according to claim 1, wherein
the adjacent layer comprises at least one sublayer, at least one sublayer of the adjacent layer comprises zirconium (Zr), oxygen (O), nitrogen (N), and at least one of yttrium (Y) and niobium (Nb), and
said at least one sublayer further comprises at least one element selected from the group consisting of:
hafnium (Hf), titanium (Ti), tantalum (Ta), germanium (Ge), silicon (Si), cerium (Ce), magnesium (Mg), and combinations thereof.

4. The medium according to claim 1, wherein
the adjacent layer comprises at least one sublayer,
at least one sublayer of the adjacent layer comprises zirconium (Zr), oxygen (O), nitrogen (N), and at least one of yttrium (Y) and niobium (Nb),
the adjacent layer comprises an interface sublayer, a reflecting sublayer, and a multi-sublayer structure sandwiched between the interface sublayer and the reflecting sublayer,
the multi-sublayer structure comprises a structure in which not less than one first film and not less than one second film are alternately stacked, and
the first film and the second film are made of different materials having the same refractive index to the light.

5. The medium according to claim 1, wherein
the recording film comprises at least germanium (Ge), antimony (Sb), and tellurium (Te), and, wherein when a composition of the recording film is represented by $Ge_{x'}Sb_{y'}Te_{z'}$ wherein $x'+y'+z'=100$,
the recording film is configured to comprise one of a composition in or on an area defined by $x'=55\cdot z'=45$, $x'=45\cdot z'=55$, $x'=10\cdot y'=28\cdot z'=42$, and $x'=10\cdot y'=36\cdot z'=54$ on a GeSbTe ternary phase diagram, and a composition above the area.

6. The medium according to claim 5, wherein a part of the composition of the recording film is substituted by bismuth (Bi) and/or tin (Sn), and, wherein when the substituted composition is represented by $(Ge_{(1-w)}Sn_w)_{x''}(Sb_v(Bi_{(1-u)}In_u)_{(1-v)})_{y''}Te_{z''}$ wherein $x''+y''+z''=100$, w and v in the composition satisfy $0\leqq w<0.5$ and $0\leqq v<0.7$ and $0\leqq u\leqq1.0$.

7. The medium according to claim 1, wherein
the recording film comprises at least germanium (Ge), bismuth (Bi), and tellurium (Te), and, wherein when a composition of the recording film is represented by $Ge_{x'}Bi_{y'}Te_{z'}$ wherein $x'+y'+z'=100$,
the recording film is configured to comprise one of a composition in or on an area defined by $x'=55\cdot z'=45$, $x'=45\cdot z'=55$, $x'=10\cdot y'=28\cdot z'=42$, and $x'=10\cdot y'=36\cdot z'=54$ on a GeBiTe ternary phase diagram, and a composition above the area.

8. The medium according to claim 1, wherein
the recording film comprises at least germanium (Ge), antimony (Sb), tellurium (Te), and nitrogen (N), and, wherein when a composition of Ge, Sb, and Te is represented by $Ge_{x'}Sb_{y'}Te_{z'}$ wherein $x'+y'+z'=100$,
the recording film is configured to comprise one of a composition in or on an area defined by $x'=55\cdot z'=45$, $x'=45\cdot z'=55$, $x'=10\cdot y'=28\cdot z'=42$, and $x'=10\cdot y'=36\cdot z'=54$ on a GeSbTe ternary phase diagram, and a composition above the area, and
1 to 5 at. % of nitrogen (N) is added to a GeSbTe-based compound comprising the composition.

9. The medium according to claim 7, wherein a part of the composition of the recording film is substituted by bismuth (Bi) and/or tin (Sn), and, wherein when the substituted composition is represented by $(Ge_{(1-w)}Sn_w)_{x''}(Sb_v(Bi_{(1-u)}In_u)_{(1-v)})_{y''}Te_{z''}$ wherein $x''+y''+z''=100$, w and v in the composition satisfy $0\leqq w<0.5$ and $0\leqq v<0.7$ and $0\leqq u\leqq1.0$, and
1 to 5 at. % of nitrogen (N) is added to one of a GeSnSbTe-based compound, a GeSbTeBi-based compound, GeSnSbTeIn-based compound, GeSbTeIn-based compound, GeSbTeBiIn-based compound, GeSbSnTeBiIn-based compound, GeSnSbTeBiIn-based compound and a GeSnSbTeBi-based compound comprising the composition.

10. An optical recording medium comprising
a substrate,
a recording film formed on the substrate and configured to reversibly change an atomic arrangement, and
an adjacent layer adjacent to the recording film, and configured to reversibly perform recording and/or erase on the recording film by using light,
wherein the adjacent layer comprises at least one sublayer,
wherein at least one sublayer of the adjacent layer comprises zirconium (Zr), oxygen (O), nitrogen (N), and at least one of yttrium (Y) and niobium (Nb),
wherein a composition of said at least one sublayer is represented by $(ZrO_{2-x}N_x)_{1-y}((Y_2O_3)_{1-z}(Nb_2O_5)_z)_y$, wherein $0<x\leqq0.5$, $0<y\leqq0.1$, and $0\leqq z\leqq1$, and
wherein a composition ratio x, y, z of the $(ZrO_{2-x}N_x)_{1-y}((Y_2O_3)_{1-z}(Nb_2O_5)_z)_y$, is determined such that an extinction coefficient of the one sublayer is $1\times10^{-2}$ or less within a range of 250 nm $\leqq\lambda\leqq$ 1,000 nm provided that a wavelength of the light is represented by $\lambda$,
wherein
the recording film comprises at least germanium (Ge), bismuth (Bi), tellurium (Te), and nitrogen (N), and, wherein when a composition of Ge, Bi, and Te is represented by $Ge_{x'}Bi_{y'}Te_{z'}$ wherein $x'+y'+z'=100$,
the recording film is configured to comprise one of a composition in or on an area defined by $x'=55\cdot z'=45$, $x'=45\cdot z'=55$, $x'=10\cdot y'=28\cdot z'=42$, and $x'=10\cdot y'=36\cdot z=54$ on a GeBiTe ternary phase diagram, and a composition above the area, and
1 to 5 at. % of nitrogen (N) is added to a GeBiTe-based compound comprising the composition.

11. The medium according to claim 1, comprising an optical disc comprising a recordable/reproducible data area, wherein the recording film is used as the data area, and information is recorded on the recording film by using an MPEG program stream and/or an MPEG transport stream.

12. An information recording/playback apparatus comprising a recording unit configured to record information on the recording film of an optical disc cited in claim 11, and a reproducing unit configured to reproduce information from the recording film on which the information is recorded.

13. An information recording/playback method comprising recording information on the recording film of an optical disc cited in claim 11, and playing back information from the recording film on which the information is recorded.

14. The medium according to claim 1, wherein
the adjacent layer comprises at least one sublayer, at least one sublayer of the adjacent layer comprises zirconium (Zr), oxygen (O), nitrogen (N), and at least one of yttrium (Y) and niobium (Nb), and
wherein when a composition of said at least one sublayer is represented by $(ZrO_{2-x}N_x)_{1-y}((Y_2O_3)_{1-z}(Nb_2O_5)_z)_y$, and a wavelength of the light is $\lambda$, a composition ratio is determined such that an extinction coefficient of said at least one layer is not more than $1\times10^{-3}$ within a range of $250$ (nm)$\leq\lambda\leq1,000$ (nm) and $0<x\leq0.2$, $0<y\leq0.1$, and $0<z\leq1$.

15. The optical recording medium of claim 1, wherein $x=0.5$.

16. The optical recording medium of claim 1, wherein $z=0$.

17. The optical recording medium of claim 1, wherein $z=1$.

18. The optical recording medium of claim 10, wherein $x=0.5$.

19. The optical recording medium of claim 10, wherein $y=0.1$.

20. The optical recording medium of claim 10, wherein $z=0$.

* * * * *